US012322918B2

(12) United States Patent
Strashny

(10) Patent No.: US 12,322,918 B2
(45) Date of Patent: Jun. 3, 2025

(54) SLIDABLE CURRENT COLLECTOR AND METHOD FOR CONTACTING CONDUCTOR RAIL

(71) Applicant: Caterpillar Global Mining Equipment LLC, Denison, TX (US)

(72) Inventor: Igor Strashny, Tucson, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 558 days.

(21) Appl. No.: 17/829,528

(22) Filed: Jun. 1, 2022

(65) Prior Publication Data

US 2023/0231350 A1    Jul. 20, 2023

Related U.S. Application Data

(63) Continuation of application No. 17/578,072, filed on Jan. 18, 2022.

(51) Int. Cl.
| | | |
|---|---|---|
| *H01R 41/00* | (2006.01) | |
| *B60L 5/08* | (2006.01) | |
| *B60L 5/16* | (2006.01) | |

(52) U.S. Cl.
CPC ............ *H01R 41/00* (2013.01); *B60L 5/08* (2013.01); *B60L 5/16* (2013.01); *H01R 2201/26* (2013.01)

(58) Field of Classification Search
CPC ....... H01R 41/00; H01R 2201/26; B60L 5/08; B60L 5/16
See application file for complete search history.

(56) References Cited

U.S. PATENT DOCUMENTS 3,804,997 A * 4/1974 Schwarzler ............. B60M 1/34
191/48
5,064,331 A * 11/1991 Yamaguchi ............ B65G 47/57
414/609

(Continued)

FOREIGN PATENT DOCUMENTS

CN   208914970 U    5/2019
CN   114929505 B *  5/2023 ............... B60L 5/38

(Continued)

OTHER PUBLICATIONS

Written Opinion and International Search Report for Int'l. Patent Appln. No. PCT/US2023/021806, mailed Aug. 23, 2023 (8 pgs).

*Primary Examiner* — Jason C Smith
(74) *Attorney, Agent, or Firm* — Lee & Hayes

(57) ABSTRACT

A slidable current collector has frame formed as central substrate and sloped shoulders on opposing lateral sides of the central substrate. Electrical terminals pass through orifices arranged in at least two rows within the central substrate. At least one bumper is disposed on an underside of the central substrate between the at least two rows. During sliding on a power rail, the electrical terminals contact a rail surface, and the current collector can shift laterally on the rail surface across a distance between the bumper and one of the sloped shoulders. If disengagement of the electrical terminals from the rail surface occurs, angles on the sloped shoulders and the at least one bumper resist excessive lateral shifting and urge the electrical contacts to reengage with the rail surface.

20 Claims, 10 Drawing Sheets

(56) References Cited

U.S. PATENT DOCUMENTS

| | | | |
|---|---|---|---|
| 8,348,035 B2* | 1/2013 | Sommer | B60L 5/39 |
| | | | 191/49 |
| 8,727,085 B2* | 5/2014 | Hiebenthal | B60L 5/08 |
| | | | 191/59 |
| 9,199,540 B2* | 12/2015 | Reiser | B60L 5/20 |
| 10,427,526 B2* | 10/2019 | Tajima | B60L 50/51 |
| 10,723,231 B2* | 7/2020 | Sarkar | B60L 3/04 |
| 10,857,890 B2* | 12/2020 | Duprat | B60L 5/08 |
| 10,875,411 B2* | 12/2020 | Morris | B60L 53/32 |
| 10,906,416 B2* | 2/2021 | Weigel | B60L 53/11 |
| 11,858,358 B2* | 1/2024 | Grothe | B60L 5/18 |
| 2011/0139561 A1* | 6/2011 | Sommer | B60L 5/39 |
| | | | 191/49 |
| 2019/0001823 A1* | 1/2019 | Duprat | B60L 5/08 |
| 2020/0189396 A1* | 6/2020 | Sakanoue | B60L 5/20 |
| 2021/0170876 A1* | 6/2021 | Grothe | B60L 5/24 |
| 2022/0131325 A1* | 4/2022 | Seidel | B60L 5/16 |
| 2023/0064169 A1* | 3/2023 | Saliger | B60L 5/24 |
| 2023/0231350 A1* | 7/2023 | Strashsny | B60L 5/16 |
| | | | 191/45 R |

FOREIGN PATENT DOCUMENTS

| | | | | |
|---|---|---|---|---|
| DE | 19529066 A1 * | 2/1997 | | B60L 5/08 |
| DE | 102014101090 A1 | 7/2015 | | |
| DE | 102022107705 A1 * | 10/2023 | | B60L 5/20 |
| EP | 0989015 A1 | 3/2000 | | |
| EP | 3495190 A1 * | 6/2019 | | B60L 5/08 |
| JP | 4258093 B2 | 10/2001 | | |
| JP | 2012239267 A * | 12/2012 | | B60L 11/02 |
| WO | 2010115305 A1 | 10/2010 | | |
| WO | 2020186296 A1 | 9/2020 | | |
| WO | WO-2022089740 A1 * | 5/2022 | | |

* cited by examiner

SLIDABLE CURRENT COLLECTOR AND METHOD FOR CONTACTING CONDUCTOR RAIL

CROSS-REFERENCE TO RELATED APPLICATION

This application is a continuation of U.S. patent application Ser. No. 17/578,072, entitled "Slidable Current Collector and Method for Contacting Conductor Rail," filed Jan. 18, 2022, which is expressly incorporated herein by reference in its entirety.

TECHNICAL FIELD

The present disclosure relates to a slidable current collector and a method for contacting a conductor rail. More specifically, the present disclosure relates to a slidable current collector having a fluid suspension distributed across an array of terminals and a method for contacting the current collector on a conductor rail with multiple degrees of freedom while sliding.

BACKGROUND

Heavy work machines, such as earth-moving vehicles or hauling trucks, require significant power to carry out their functions. The machines themselves can be of substantial weight, and their loads require large amounts of power to move. Diesel engines typically provide that power, but the use of machines powered by diesel engines may not be appropriate in certain environments. For instance, in some implementations, heavy work machines may need to travel large distances through rugged terrain. At a remote mining site, for example, groups of these machines are often employed to ferry extreme loads along roadways, or haul routes, extending between various locations within the mining site. Supplies of diesel fuel may be far away from such locations or not easily delivered to such locations. In addition, the groups of diesel machines can generate significant pollution.

A power rail based on the ground may provide electrical power to traveling vehicles such as heavy work machines. In some environments, such as with trains or subways that travel on a fixed track, precise alignment between the fixed track and the power rail can ensure reliable delivery of electrical power to a current collector as the vehicle moves. For a heavy work machine that is freely steerable, however, establishing and maintaining an electrical connection between a current collector attached to an extended arm and the power rail can be particularly challenging. The rails may be slightly uneven, twisted, or curved, possibly leading to disconnections or arcing. Arcing can degrade current flow and damage components.

In some environments, such as a mining site, the terrain can also interfere with continuous connection with power rails for a freely steerable work machine along a haul route. The haul route may be uneven, hilly, and pocked, which can lead to steering deviations that could also cause arcing at the current collector. These variations in terrain can also cause the machine to disconnect from the rail, detracting from the value of rail-based delivery of electrical power. While increasing adhesion between the current collector and the rail may decrease disconnections, increased adhesion at the current collector leads to unwanted drag on the arm of the work machine and accelerates wear on the current collector.

One approach for contacting a current collector and a power rail is described in U.S. Pat. No. 3,804,997 ("the '997 patent"). The '997 patent describes a system for a train traveling at high speeds that purports to counteract the fluttering of contact shoes sliding against a powered rail, which can interrupt electrical contact. A contactless force field, which may be magnetic or pneumatic, provides offsetting forces to stabilize the collector shoe against the power rail with fixed spacing during high-speed travel. The system of the '997 patent, however, addresses only fluttering of collector shoes with a vehicle traveling in fixed relation to a powered rail and does not contemplate positional deviations in multiple dimensions between a freely steerable vehicle and the powered rail. Nor does the system of the '997 patent address a risk of the collector shoes becoming detached from the power rail during the positional deviations. As a result, the system of the '997 patent is insufficient for freely steerable vehicles having current collectors sliding over a power rail along a haul route that may vary over diverse terrain.

Examples of the present disclosure are directed to overcoming deficiencies of such systems.

SUMMARY

In an aspect of the present disclosure, an electric current collector for sliding in a direction along one or more power rails includes a substrate having a central longitudinal axis, an upper surface, a lower surface, an inner lateral edge, and an outer lateral edge. The inner lateral edge and the outer lateral edge are on opposite sides of the central longitudinal axis. The current collector also includes an inner wall extending below the substrate from the inner lateral edge at an inner obtuse angle relative to the lower surface and an outer wall extending below the substrate from the outer lateral edge at an outer obtuse angle relative to the lower surface. A first bumper is disposed along the lower surface of the substrate and extends substantially parallel to the longitudinal axis. A first electrical terminal has a first contact that projects from the lower surface between the inner side and the first bumper.

In another aspect of the present disclosure, a work machine includes an electric engine, traction devices configured to cause movement of the work machine disposed proximate a haul route when powered by the electric engine, and a current collector configured to move across a surface of at least one power rail along the haul route and conduct electrical energy to the electric engine. The current collector includes a frame having a central substrate along a longitudinal axis and sloped shoulders on opposing lateral sides of the central substrate. The central substrate has a first surface and a second surface opposite the first surface with orifices extending from the first surface to the second surface, wherein the orifices are arranged in at least two rows substantially parallel to the longitudinal axis. In addition, electrical terminals positioned within the orifices, and at least one triangular wedge extending along an underside of the central substrate between the at least two rows.

In yet another aspect of the present disclosure, a method for powering a work machine from at least one power rail includes establishing a slidable connection between a current collector associated with the work machine and a rail surface of the at least one power rail, where the current collector includes a central substrate along a longitudinal axis, a sloped shoulder on a lateral side of the central substrate, at least two rows of electrical contacts on an underside of the central substrate, and at least one bumper between the at least two rows of electrical contacts. The method includes sliding the current collector across the rail surface in the direction of the longitudinal axis. During the sliding, first lateral shifting of the current collector on the rail surface is permitted across a distance between the bumper and the sloped shoulder. During the sliding, upon disengagement of the current collector from the rail surface, second lateral shifting of the current collector is resisted beyond the distance between the bumper and the sloped shoulder, where the second lateral shifting is larger than the first lateral shifting.

DETAILED DESCRIPTION

Figure 1:
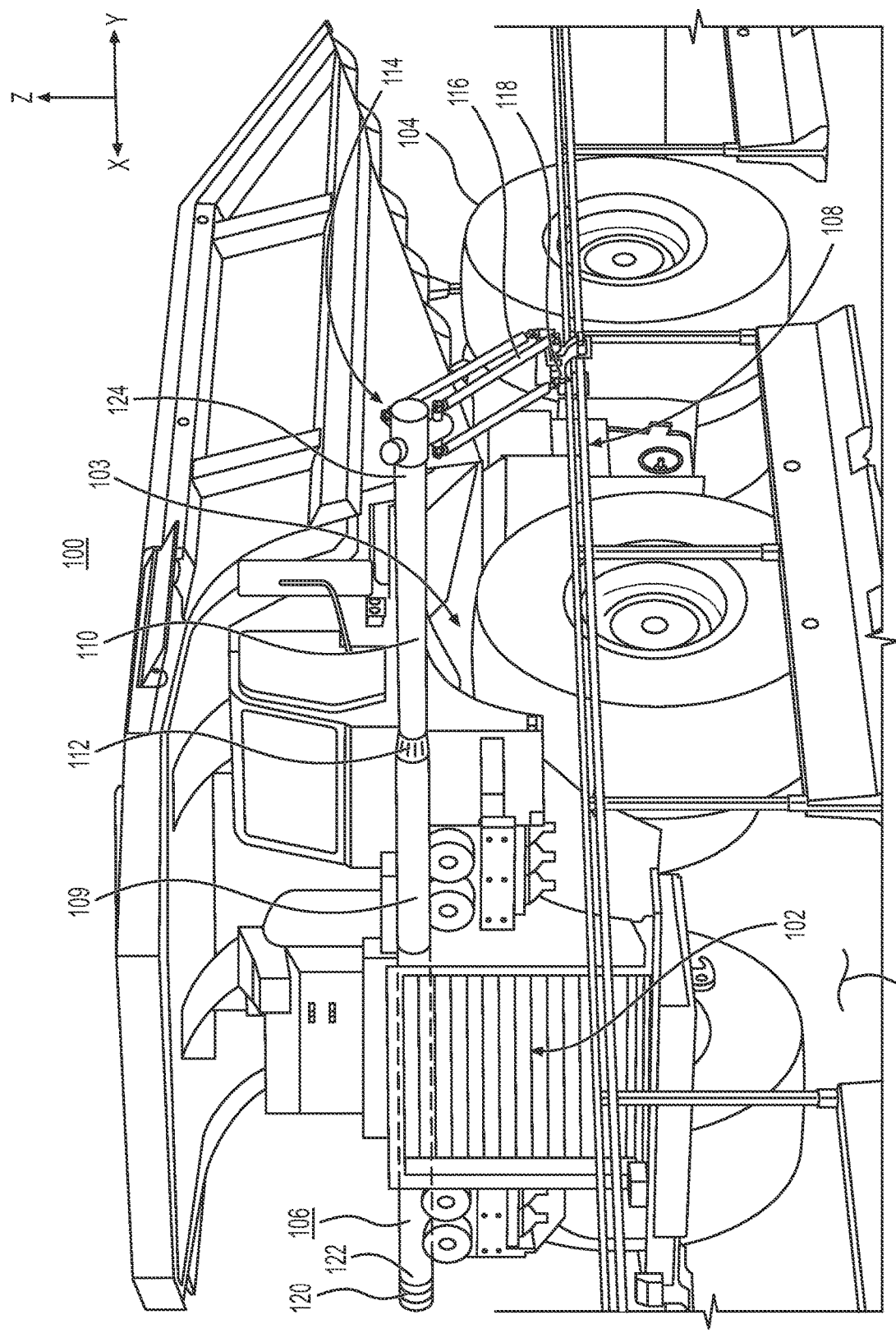
FIG. 1 is an isometric view of an electrically powered work machine coupled to a roadside power source in accordance with an example of the present disclosure.

Wherever possible, the same reference numbers will be used throughout the drawings to refer to same or like parts. Multiple instances of like parts within a figure may be distinguished using a letter suffix. FIG. 1 illustrates an isometric view of a work machine 100 within an XYZ coordinate system as one example suitable for carrying out the principles discussed in the present disclosure. Exemplary work machine 100 travels along a defined path or roadway, typically from a source to a destination within a worksite. In one implementation as illustrated, work machine 100 is a hauling machine that carries a load within or from a worksite within a mining operation. For instance, work machine 100 may haul excavated ore or other earthen materials from an excavation area along roads to dump sites and then return to the excavation area. In this arrangement, work machine 100 may be one of many similar machines configured to ferry earthen material in a trolley arrangement. While illustrated as a large mining truck in this instance, work machine 100 may be any machine that carries a load between different locations within a worksite, examples of which include Wherever possible, the same reference numbers will be used throughout the drawings to refer to same or like parts. FIG. 1 illustrates an isometric view of a work machine 100 within an XYZ coordinate system as one example suitable for carrying out the principles discussed in the present disclosure. Exemplary work machine 100 travels along a defined path or roadway, also termed haul route 101, typically from a source to a destination within a worksite. In one implementation as illustrated, work machine 100 is a hauling machine that carries a load within or from a worksite within a mining operation. For instance, work machine 100 may haul excavated ore or other earthen materials from an excavation area along haul route 101 to dump sites and then return to the excavation area. In this arrangement, work machine 100 may be one of many similar machines configured to ferry earthen material in a trolley arrangement. While illustrated as a large mining truck in this instance, work machine 100 may be any machine that carries a load between different locations within a worksite, examples of which include an articulated truck, an off-highway truck, an on-highway dump truck, a wheel tractor scraper, or any other similar machine. Alternatively, work machine 100 may be an off-highway truck, on-highway truck, a dump truck, an articulated truck, a loader, an excavator, a pipe layer, or a motor grader. In other implementations, work machine 100 need not haul a load and may be any movable machine associated with various industrial applications including, but not limited to, mining, agriculture, forestry, construction, and other industrial applications.

Referring to FIG. 1, an example work machine 100 includes a frame 103 powered by electric engine 102 to cause rotation of traction devices 104. Traction devices 104 are typically four or more wheels with tires, although tracks or other mechanisms for engagement with the ground along haul route 101 are possible. Electric engine 102 functions to provide mechanical energy to work machine 100 based on an external electrical power source, such as described in further detail below. A primary example of mechanical energy provided by electric engine 102 is propelling traction devices 104 to cause movement of work machine 100 along haul route 101, but electric engine 102 also includes components sufficient to power other affiliated operations within work machine 100. For instance, in some implementations, electric engine 102 includes equipment for converting electrical energy to provide pneumatic or hydraulic actions within work machine 100. While electric engine 102 is configured to operate from an external electrical power source, electric engine 102 typically includes one or more batteries for storing electrical energy for auxiliary or backup operations.

In accordance with the principles of the present disclosure, work machine 100 further includes a conductor rod 106 configured to receive electrical power from a power rail 108. In some examples, power rail 108 includes one or more beams of metal arranged substantially parallel to and at a distance above the ground. Support mechanisms hold power rail 108 in place along a distance at the side of a haul route 101 for work machine 100 to traverse. The support mechanisms and power rail 108 may be modular in construction, enabling their disassembly and reassembly at different locations or their repositioning along the existing haul route 101. Moreover, while shown in FIG. 1 to the left of work machine 100 (along the Y axis) as work machine 100 travels in the direction of the X axis, power rail 108 may be installed to the right of work machine 100 (along the —Y axis) or in other locations suitable to the particular implementation. In many examples, such as within a mining site, power rail 108 will not be configured continuously at a fixed distance along a side of haul route 101 and at a fixed height above the ground due, at least in part, to the variation of the terrain. Therefore, it is expected that the vertical, horizontal, and angular positions of the surface of power rail 108 in the XYZ planes will vary along haul route 101.

Power rail 108 provides a source of electrical power for work machine 100 as either AC or DC voltage. In some examples, power rail 108 has two or more conductors, each providing voltage and current at a different electrical pole. In one implementation (e.g., an implementation in which the power rail 108 includes three conductors), one conductor provides positive DC voltage, a second conductor provides negative DC voltage, and a third conductor provides a reference voltage of 0 volts, with the two powered conductors providing +1500 VDC and −1500 VDC. These values are exemplary, and other physical and electrical configurations for power rail 108 are available and within the knowledge of those of ordinary skill in the art.

Conductor rod 106 enables electrical connection between work machine 100 and power rail 108, including during movement of work machine 100 along haul route 101. In the example shown in FIG. 1, conductor rod 106 is an elongated arm resembling a rigid pole. FIG. 1 shows conductor rod 106 positioned along a front side of work machine 100, with respect to the direction of travel of work machine 100 in the direction of the X axis. In this arrangement, conductor rod 106 is located in FIG. 1 in the Y-Z plane essentially along the Y axis with a proximal end near a right side of work machine 100 and a distal end at a left side of work machine 100. Conductor rod 106 may be attached to any convenient location within work machine 100, such as to frame 103, in a manner to enable conductor rod 106 to reach and couple to power rail 108. Shown in FIG. 1 as extending to a left side of work machine 100 toward power rail 108, conductor rod 106 may alternatively be arranged to extend to a right side (along the —Y axis) and at any desired angle from work machine 100 such that conductor rod 106 may be coupled to power rail 108 for obtaining electrical power.

As embodied in FIG. 1, conductor rod 106 includes a cylinder portion 109 mounted to frame 103 of work machine 100. Cylinder portion 109 has a hollow interior and may be a conductive metal having suitable mechanical strength and resiliency, such as aluminum. Within cylinder portion 109, an extension 110 is retained. Extension 110 is slidably engaged within cylinder portion 109 of conductor rod 106 such that it may be extended or retracted axially, i.e., along the Y axis in FIG. 1, to adjust the reach of conductor rod 106. Specifically, in a retracted position, extension 110 is caused to slide within cylinder portion 109 of conductor rod 106 such that a length of conductor rod 106 roughly spans the width of work machine 100. A junction 112 serves as the interface between extension 110 and cylinder portion 109, which is the main body of conductor rod 106. When extension 110 is fully retracted or collapsed into cylinder portion 109, junction 112 essentially becomes the left edge of conductor rod 106. On the other hand, when extension 110 is extended from cylinder portion 109 of conductor rod 106, extension 110 may reach from work machine 100 to above or near power rail 108 on the side of haul route 101.

Within, and possibly including cylinder portion 109, conductor rod 106 has a series of electrical conductors passing longitudinally, i.e. along the Y axis in FIG. 1, at least from a base 122 at a proximal end to a tip 124 at a distal end. Typically, the conductors within conductor rod 106 are formed of a metallic material. Moreover, as with cylinder portion 109, the material for conductors within conductor rod 106 typically have suitable mechanical strength and resiliency to permit their stable extension from work machine 100 to above power rail 108 at the side of haul route 101. In some examples, the conductors are concentric tubes, or hollow cylinders, of solid metal such as aluminum nested together and sized to provide electrical capacity sufficient for powering work machine 100. Tubular conductors within extension 110 slidably engage with corresponding tubular conductors in the portion of conductor rod 106 mounted on work machine 100. This engagement while the tubes slide ensures electrical continuity during extension or retraction of conductor rod 106.

At tip 124 of extension 110 within conductor rod 106, a connector assembly 114 provides an interface to power rail 108 via trailing arms 116 and current collector 118. The arrangement of connector assembly 114, trailing arms 116, and current collector 118 of FIG. 1, which are collectively also referred to as a trailing assembly, are described in further detail in FIG. 2. Power rail 108 is typically arranged along a side of haul route 101, and work machine 100 traverses haul route 101 substantially in parallel with power rail 108. Thus, in reference to FIG. 1, power rails 108 and a travel path for work machine 100 are substantially in parallel with each other and with the X axis. Current collector 118 is configured to maintain an electrical connection with power rail 108 while sliding along its surface in the direction of the X axis as work machine 100 moves. In some examples, trailing arms 116 are conductors coupled to current collector 118, each conducting voltage and current at a different electrical pole for respective conductors within conductor rod 106. In operation, electrical power is accessed from power rail 108 via current collector 118, which remains in contact during movement of work machine 100, and the electrical power is conducted through trailing arms 116 into connector assembly 114.

From connector assembly 114, the electrical power is conveyed at tip 124 through the nested tubular conductors within extension 110 and cylinder portion 109 to head 122 of conductor rod 106 and through a head-end interface 120 to work machine 100. Head-end interface 120 provides at least an electrical connection between conductor rod 106 and work machine 100 for powering electric engine 102 and otherwise enabling operations within work machine 100. In some examples, head-end interface 120 may also provide an interface for controls between work machine 100 and conductor rod 106. In some examples, head-end interface 120 includes passageways to control mechanical operation of conductor rod 106, such as for pressurized fluid of a pneumatic or hydraulic control system to extend and retract extension 110 or to control operations within current collector 118 in a manner described further below. In other examples, head-end interface 120 includes passageways for signals to communicate with electronic controls.

Figure 2:
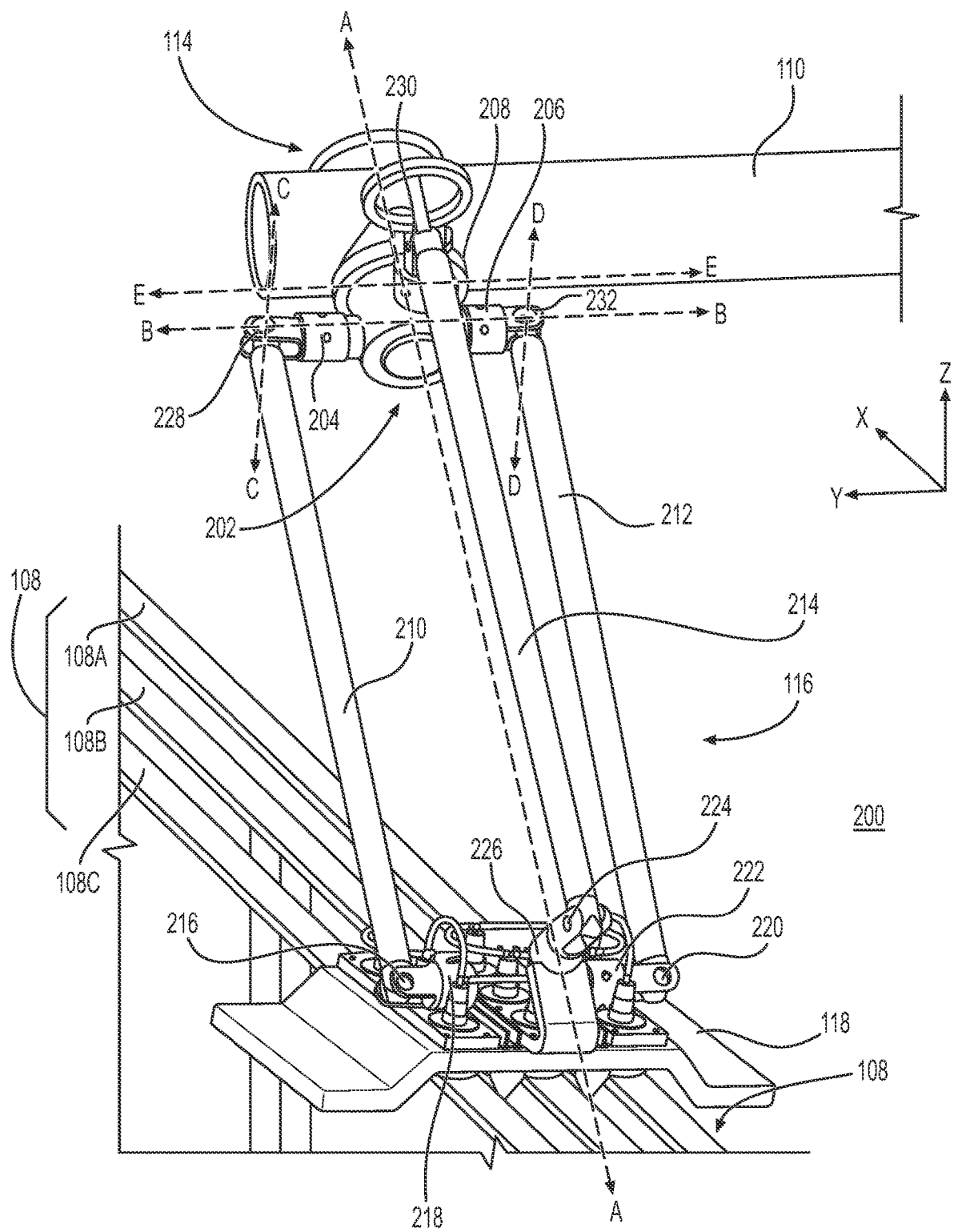
FIG. 2 is a partial isometric rear view of a conductive rod and trailing arms in accordance with an example of the present disclosure.

Connector assembly 114 not only provides electrical connection between the conductors within extension 110 of conductor rod 106 and trailing arms 116, but also accommodates the various changes in relative position between power rail 108 and work machine 100 during travel along haul route 101. Those changes in relative position can include multiple deviations, such as those occurring laterally (work machine 100 and connector assembly 114 moving in the Y axis relative to current collector 118), vertically (work machine 100 and connector assembly 114 moving in the Z axis relative to current collector 118), and angularly (work machine 100 and connector assembly 114 moving in the X-Y plane angularly around the Z axis). One or all of these deviations could occur as a driver steers work machine 100 along haul route 101, work machine 100 responds to an uneven or pocked roadway, or an orientation of power rail 108 varies with respect to work machine 100. FIG. 2 is discussed below and illustrates an example trailing assembly 200 suitable for accommodating multiple deviations in position between work machine 100 and current collector 118.

FIG. 2 is a view from a side of power rail 108 opposite work machine 100 facing generally forward (i.e., along the X axis), which shows a trailing assembly 200 from a back side of extension 110. As shown in the example of FIG. 2, power rail 108 contains three conductors separately identified as inner rail 108A, middle rail 108B, and outer rail 108C, with "inner," "middle," and "outer" describing a respective position relative to work machine 100. As well, in this instance and elsewhere in this disclosure, the suffix "A" denotes a component associated with an electrical path including inner rail 108A, suffix "B" denotes a component associated with an electrical path including middle rail 108B, and suffix "C" denotes a component associated with an electrical path including outer rail 108C. The absence of an "A," "B," or "C" suffix may connote a component discussed generically or collectively in the system without association with a specific power rail.

In one example, two of the conductors in FIG. 2 provide electrical power at different polarities while the third conductor provides a reference of 0 volts. In other examples, the conductors can provide AC voltage at three different polarities or power rail 108 and conductor rod 106 can contain fewer or more than three conductors. Current collector 118, described in more detail below, is electrically coupled to power rail 108 and slides along its surface to maintain an electrical connection with each of inner rail 108A, middle rail 108B, and outer rail 108C. Ultimately, current collector 118 provides the electrical interface between power rail 108 and trailing arms 116.

As shown in FIG. 2, connector assembly 114 within trailing assembly 200 is integrated into extension 110. Although not shown, connector assembly 114 bridges between three conductors within extension 110 and a rotational interface 202, which exits at a bottom portion of extension 110. Rotational interface 202 in turn couples the three conductors within 110 to respective trailing arms 116, namely, outer arm 210, inner arm 212, and middle arm 214, and uses socket and hinge joints to enable ranges of motion for trailing arms 116. As well, rotational interface 202 permits twisting of trailing arms 116 about an axis A-A. Referring to outer arm 210, rotational interface 202 connects to a first conductor (not shown) within extension 110 and includes outer lug 204 arranged generally parallel to the Y axis. A socket joint within outer lug 204 provides rotational movement for outer arm 210 about the axis B-B. In the illustrated example, an outer hinge 228 is coupled to outer lug 204 and further enables outer arm 210 to rotate about an axis C-C, as shown in FIG. 2.

Referring to inner arm 212, rotational interface 202 connects to a second conductor (not shown) within extension 110 and includes an inner lug 206 that provides a rotational movement about axis B-B within a socket joint similar to outer lug 204. As well, inner lug 206 is coupled to an inner hinge 232, which enables inner arm 212 to pivot about an axis D-D, as shown in FIG. 2. A similar socket and hinge arrangement is illustrated in FIG. 2 for coupling middle arm 214 to a third conductor (not shown) within extension 110. In particular, a middle lug 208 exits rotational interface 202 and provides rotational ability of middle arm 214 about a central axis (not labeled) perpendicular to axis B-B. Further, a middle hinge 230 is coupled to middle lug 208 and provides freedom for second arm 214 to pivot about an axis (not shown) parallel to axis B-B. In short, each of trailing arms 116 is coupled to extension 110 via a pivoted and hinged interface that permits movement of the arms with multiple degrees of freedom with respect to extension 110.

At their opposite ends, trailing arms 116 connect via similar configurations with current collector 118 allowing movement of the arms with multiple degrees of freedom with respect to current collector 118. In some examples, the components within 118 associated with trailing arms 116 have axes of rotation parallel to those within connector assembly 114, such as about axes A-A, B-B, C-C, and D-D, but the additional axes within current collector 118 are not shown on FIG. 2 for simplicity. In some examples, for outer rail 108C, outer arm 210 is connected to an outer contactor hinge 216 and an outer contactor lug 218. For inner rail 108A, inner arm 212 is connected to an inner contactor hinge 220 and an inner contactor lug 222. For middle rail 108B, middle arm 214 is connected to a middle contactor hinge 224 and a middle contactor lug 226. These mechanical linkages are illustrative only and are described to provide context for the discussion of movement by current collector 118 below.

Electrically, the connections within trailing assembly 200 provide a path for the conduction of electrical power from power rail 108 to the conductors within extension 110. As work machine 100 moves along haul route 101, extension 110 pulls trailing arms 116 generally parallel to the X axis. Current collector 118 rests on power rail 108 and is thereby caused to slide along the surface of inner rail 108A, middle rail 108B, and outer rail 108C during movement of work machine 100. While sliding, current collector 118 maintains physical and electrical contact with power rail 108, passing electrical power from power rail 108 to trailing arms 116.

Mechanically, the combined actions of the lugs and hinges within rotational interface 202 and within current collector 118 enable flexible and versatile movement of trailing arms 116 between extension 110 and current collector 118. As work machine 100 moves forward (in the direction of the X axis), trailing arms 116 and current collector 118 trail behind extension 110. If the position of extension 110 changes with respect to the position of current collector 118, trailing assembly 200 permits trailing arms 116 to move in several directions and maintain the connection between current collector 118 and power rail 108. Risks of current collector 118 disconnecting from power rail 108 or causing arcing due to smaller deviations as work machine 100 travels along haul route 101 may be caused by variations in the alignment of power rail 108 or imperfections in the surface conditions of inner rail 108A, middle rail 108B, or outer rail 108C. FIGS. 3-10 illustrate features of current collector 118 to provide a secure and quality electrical contact with power rail 108 despite deviations at the rails.

Figure 3:
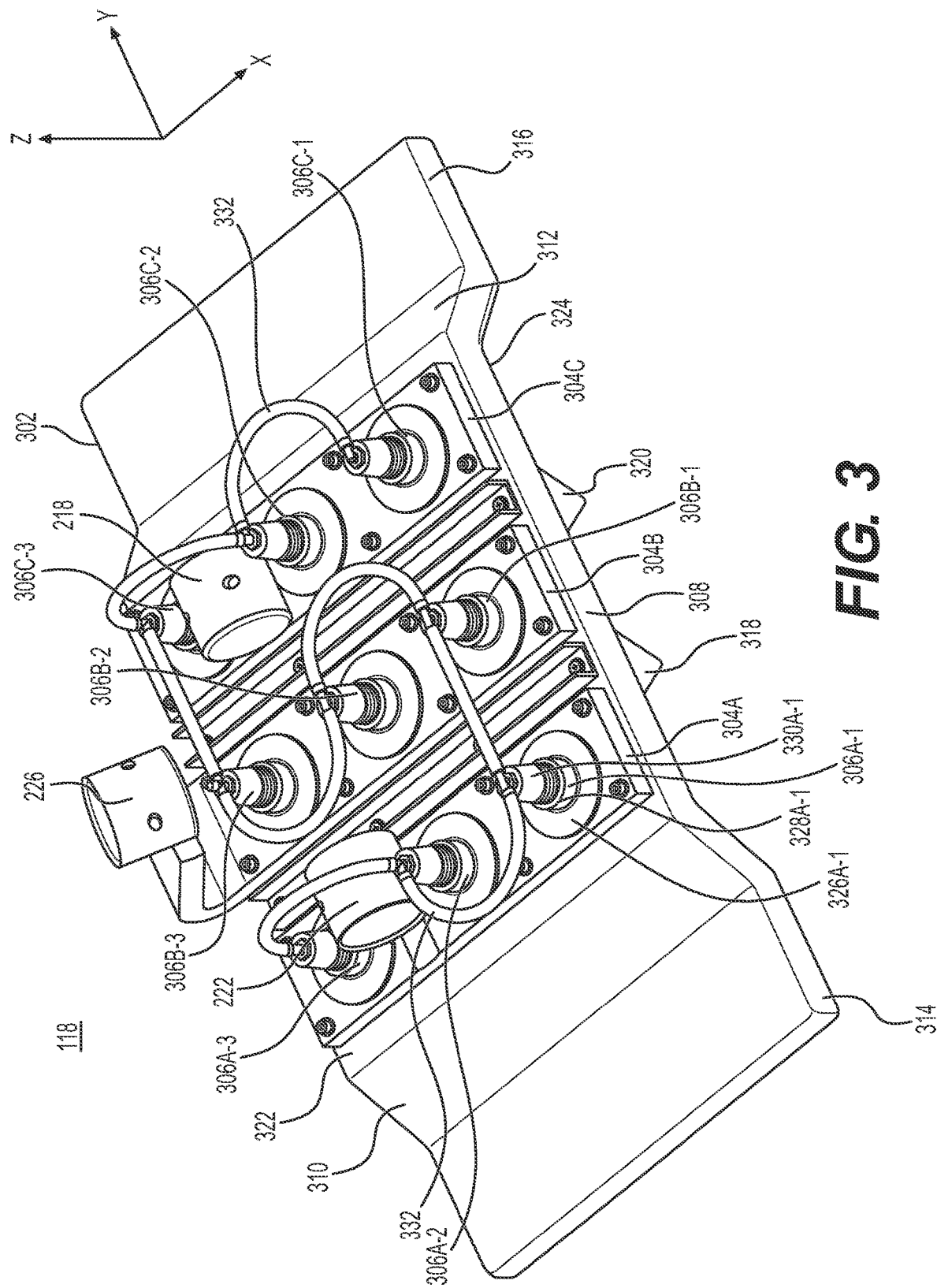
FIG. 3 is an isometric view of a current collector having a plurality of terminals in accordance with an example of the present disclosure.

FIG. 3 illustrates an isometric view of current collector 118 looking outward and backward with respect to conductor rod 106, i.e., looking between the —X axis and the +Y axis. In other words, FIG. 3 essentially shows a view of current collector 118 from extension 110 as current collector 118 rests on power rail 108. In the illustrated examples, current collector 118 generally includes at least a frame 302, busbars (referred to collectively as 304) as conductors associated with respective trailing arms 116, and one or more terminals (referred to collectively as 306) interfacing between power rail 108 and busbars 304. Each of these components is discussed below.

Frame 302 serves as a structural base for current collector 118. To decrease drag on conductor rod 106, frame 302 may be constructed with dielectric materials that are light in weight yet structurally resilient. In some examples, an exterior of frame 302 is made of fiberglass while an interior is a foamed material such as a polymer, and the overall frame weighs about 5 KG. Other material options and weights for frame 302 are available and will be apparent to those of ordinary skill in the art based on the intended implementation. As illustrated in FIG. 3, frame 302 roughly resembles a hat in its shape and may have a substrate 308 within the X-Y plane at its center. Substrate 308 is substantially flat across the X-Y plane and configured in operation to be positioned on top of and parallel to power rail 108. At opposing lateral sides (i.e., along the Y axis), substrate 308 merges with an angled inner side 310 and an angled outer side 312, which merge respectively with an inner flange 314 and an outer flange 316. The angled inner side 310 and angled outer side 312 each transition a height of frame 302 (dimensionally along the Z axis) from a top surface 322 on substrate 308 to inner flange 314 and outer flange 316. An inner bumper 318 and an outer bumper 320 are attached to frame 302 at an underside 324 of substrate 308. Variations in the dimensional characteristics of frame 302, particularly a width along the X axis for substrate 308 and a slope of angled inner side 310 and angled outer side 312, together with the role of inner bumper 318 and outer bumper 320 are discussed with respect to FIGS. 7 and 8 below.

Mounted on top surface 322 of substrate 308, busbars 304 are conductors that provide electrical interconnections between current collector 118 and trailing arms 116. Accordingly, busbars 304 in some examples are plates of aluminum or similar conductive material attached to top surface 322 through bolts or similar attachment devices. One busbar is shown for each rail within power rail 108. For a system as in FIGS. 1 and 2 having three power rails, substrate 308 includes an inner busbar 304A corresponding to inner rail 108A, a middle busbar 304B corresponding to middle rail 108B, and an outer busbar 304C corresponding to outer rail 108C. In some examples, each of the busbars 304 is secured on top surface 322 as rectangular strips positioned in general alignment with its corresponding power rail. Thus, in the example of FIG. 3, inner busbar 304A is mounted on substrate 308 parallel to the X axis and to inner rail 108A underneath (FIG. 2), as is middle busbar 304B parallel to and over middle rail 108B and 304C over outer rail 108C. Each of the busbars 304 provides a connection to a corresponding one of trailing arms 116 (FIG. 2). Specifically, inner contactor lug 222 serves as an electrical and mechanical interface between inner busbar 304A and inner arm 212 (FIG. 2), as does middle contactor lug 226 for middle busbar 304B and middle arm 214 and outer contactor lug 218 for outer busbar 304C and outer arm 210.

In addition, current collector 118 includes one or more terminals 306 that are secured within each of the busbars 304 and substrate 308. Described in more detail below with respect to FIGS. 4-6, terminals 306 provide electrical conductivity between power rail 108 and busbars 304. Specifically, while not shown in FIG. 3, each of inner busbar 304A, middle busbar 304B, and 304C and substrate 308 have holes through them for receiving and retaining terminal 306. At underside 324 of substrate 308, terminals 306 contact power rail 108 and remain in contact as work machine 100 travels along haul route 101. Terminals 306 conduct electrical power from power rail 108 to busbars 304, which then conduct the electrical power to trailing arms 116 for use by work machine 100. In some examples, a plurality of terminals 306 are employed for each power rail. In the example of FIG. 3, current collector 118 has three terminals 306 accessing electrical power from each power rail. Namely, first inner terminal 306A-1, second inner terminal 306A-2, and third inner terminal 306A-3 are affixed within inner busbar 304A and configured to slide across inner rail 108A. In this context, the suffix "-n" designates multiple occurrences of a component associated with a common conductor rail, e.g., "A-1" and "A-2" as multiple ones of the same component associated with inner rail 108A. Similarly, first middle terminal 306B-1, second middle terminal 306B-2, and third middle terminal 306B-3 are affixed within middle busbar 304B and configured to slide across middle rail 108B. Finally, first outer terminal 306C-1, second outer terminal 306C-2, and third outer terminal 306C-3 are affixed within 304C and configured to slide across outer rail 108C.

Above top surface 322 of substrate 308, only a portion of terminals 306 is visible. Illustrated in the lower left corner of FIG. 3 for first inner terminal 306A-1, a first inner shoulder 326A-1 encircles a portion of first inner terminal 306A-1 above inner busbar 304A and provides electrical contact between inner rail 108A and inner busbar 304A. Above first inner shoulder 326A-1, a first inner neck 328A-1 and a first inner cap 330A-1 extends at the uppermost portion of first inner terminal 306A-1. First inner neck 328A-1 provides additional electrical conductivity between inner rail 108A and inner busbar 304A. First inner shoulder 326A-1, first inner neck 328A-1, and first inner cap 330A-1 are discussed below with respect to FIGS. 4-6. Similar structures may exist for the other terminals 306 in current collector 118.

Figure 5:
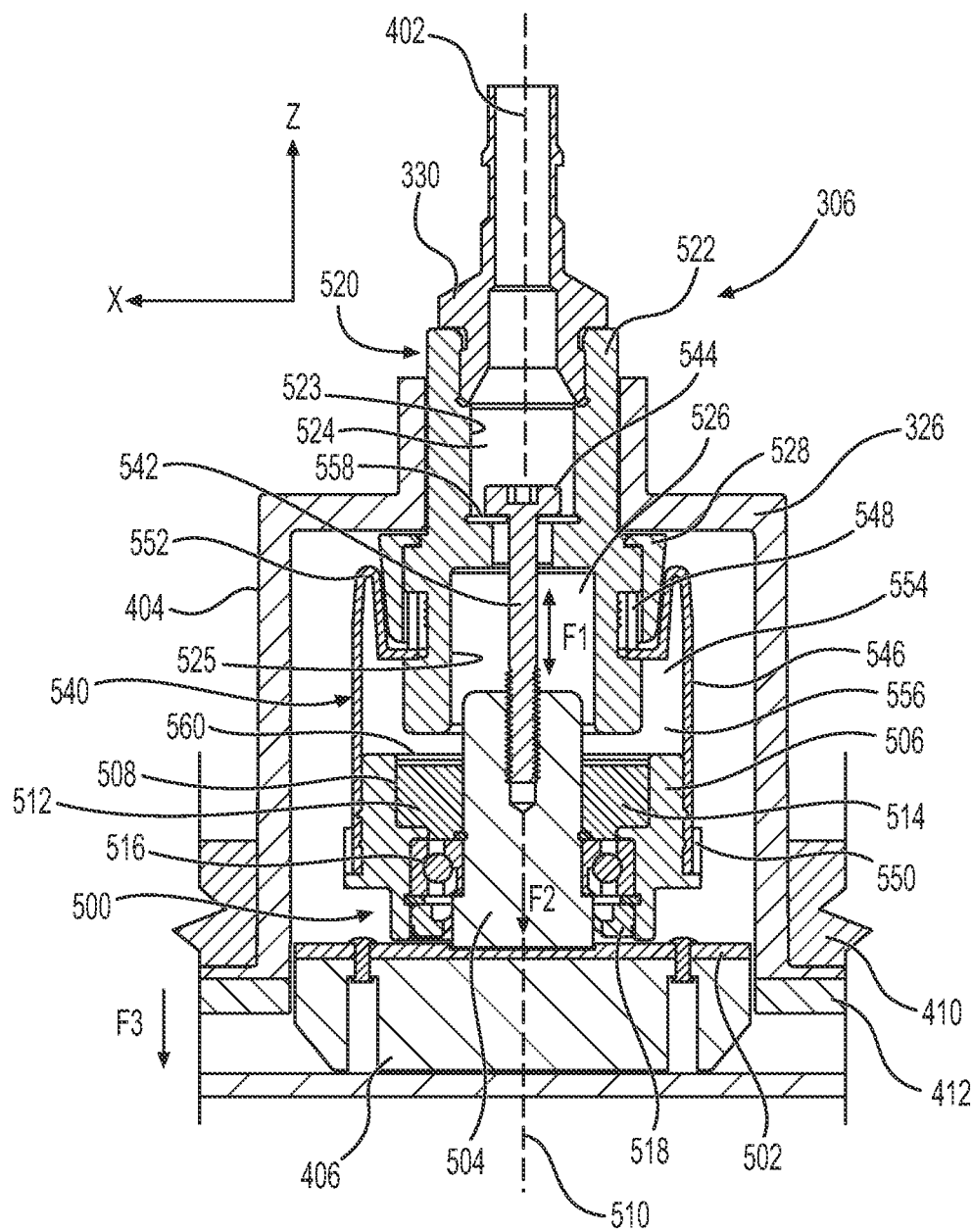
FIG. 5 is a cross-sectional side view of the representative terminal of FIG. 4 in a state of full extension in accordance with an example of the present disclosure.
Figure 6:
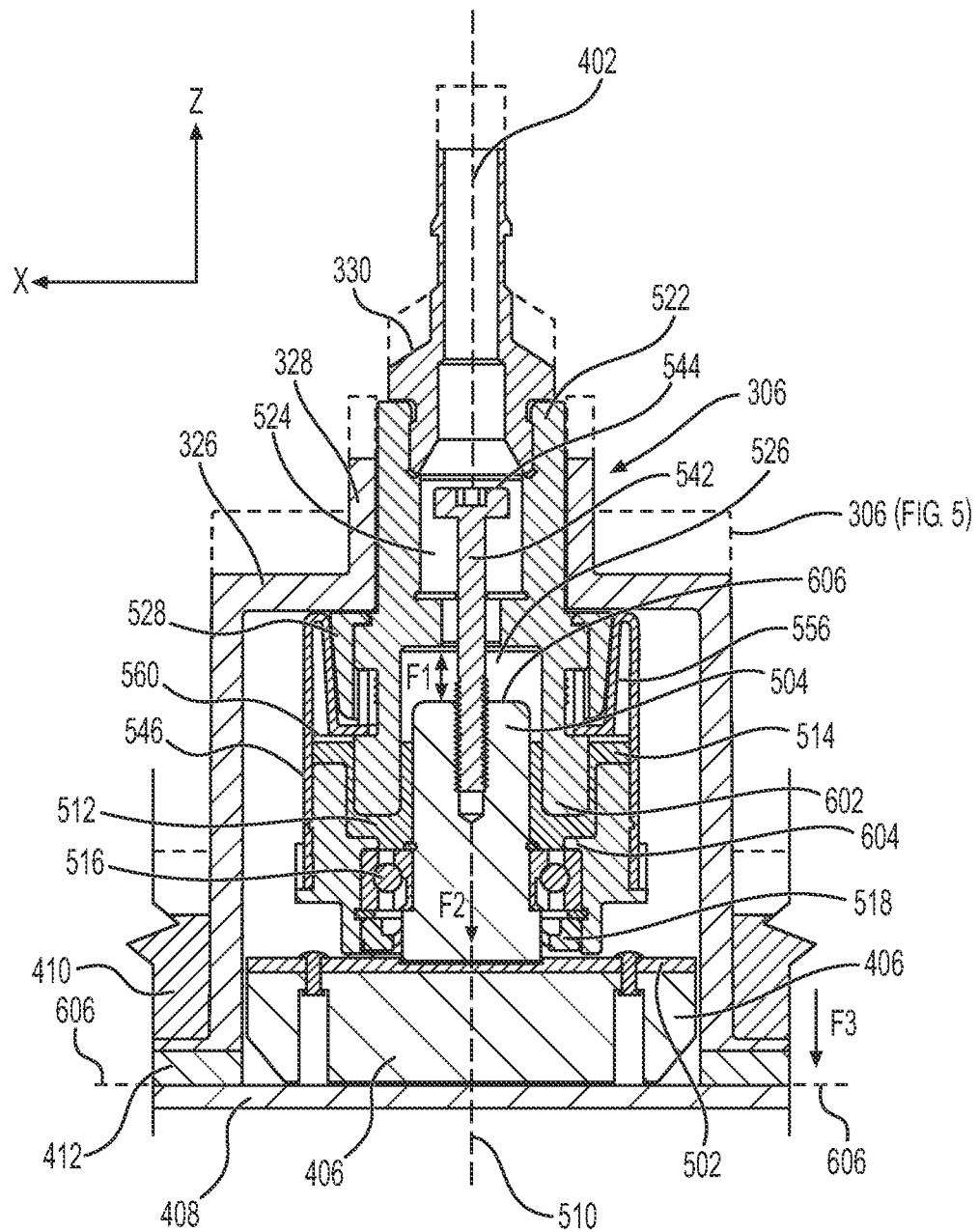
FIG. 6 is a cross-sectional side view of the representative terminal of FIG. 4 in a state of partial compression in accordance with an example of the present disclosure.

Although FIG. 3 depicts redundancy of terminals 306 for each power rail, more or fewer than three terminals (including one) may be used for each rail. The redundancy can increase the quality and continuity of contact with a respective power rail, guard against degradation in the contact due to wear or operation of an individual terminal, and distribute mechanical and electrical loads across more than one terminal. The array of terminals 306, shown in FIG. 3 as a matrix of three terminals 306 for each of three rails in an arrangement of rows and columns, can be networked together to improve their performance. In a manner discussed in more detail below with respect to FIGS. 4-6, pressurized fluid may enhance the operation of one or more of terminals 306. To that end, tubes 332 feed pressurized fluid, typically air, across the array of terminals 306. While not shown, tubes 332 may also pass from conductor rod 106, through trailing arms 116, and into one or more of inner contactor lug 222, middle contactor lug 226, or outer contactor lug 218. A pneumatic or hydraulic control system within conductor rod 106 and/or work machine 100 can regulate and deliver the pressurized fluid through passageways in trailing arms 116, through tubes 332, and into caps 330 for each of the terminal 306. While FIG. 3 provides an overview of the general components on current collector 118, FIGS. 4-6 isolate a representative terminal within current collector 118 to show its structure and function.

Figure 4:
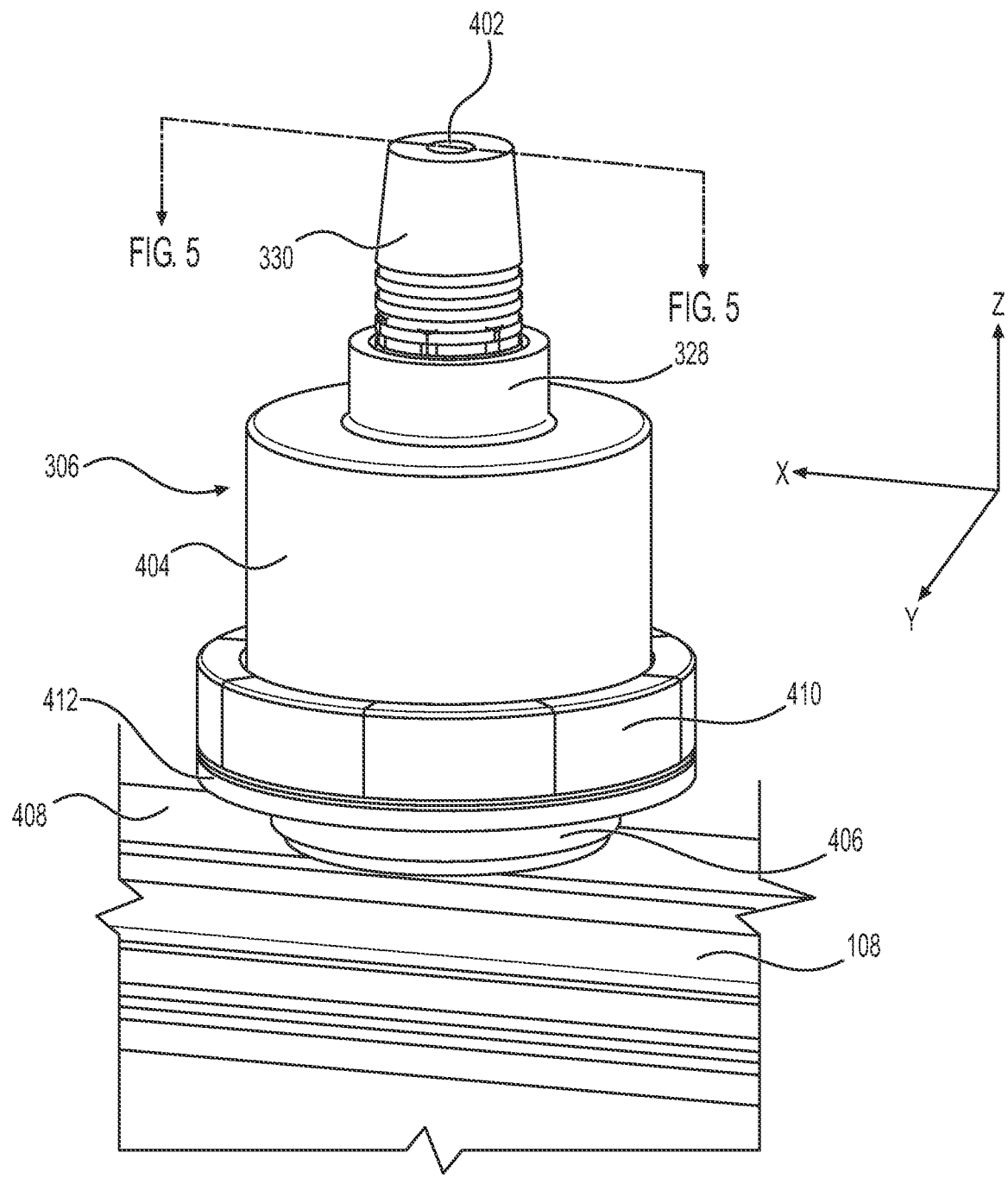
FIG. 4 is an isometric view of a representative terminal and rail in accordance with an example of the present disclosure.

FIG. 4 illustrates a representative terminal 306 separated from current collector 118 and positioned on a representative one of the power rails. The figure shows a terminal 306 from a perspective looking toward work machine 100 as terminal 306 would slide to the left (parallel to the X axis) during forward movement of work machine 100. As terminal 306 is representative, reference numbers for its parts do not include suffixes tied to particular power rails or locations within a frame 302, and the structure and operation of terminal 306 could be applied to one or more other contactor terminals within current collector 118. Similar to what is shown in FIG. 3, shoulder 326, neck 328, and cap 330 make up an external upper portion of terminal 306, which is exposed above top surface 322 in current collector 118. Cap 330 includes an passageway 402, which is a central orifice passing into terminal 306. As shown in FIG. 3, tubes 332 made of elastomeric or similar material may connect with cap 330 and feed pressurized fluid, such as air or other gas, into passageway 402. In some examples, cap 330 is a so-called quick-connect device, providing the ability to be snapped onto or removed from terminal 306 with slight manipulation and force applied along the Z axis. In other examples, cap 330 is threaded and can be screwed on or unscrewed from terminal 306 as needed. Shoulder 326 and neck 328 are an upper part of a body 404 that serves as an exterior body for terminal 306. As shown, in one example, body 404 is a substantially cylindrical shape and fits snugly within a similarly sized orifice through a corresponding one of the busbars 304 and through substrate 308. Body 404 may be made of any conductive and resilient material, such as an aluminum alloy or similar material.

At a lower portion of terminal 306, a slidable electrical contact labeled as carbon brush 406 extends from a bottom of body 404. While described as a carbon brush, the element at 406 may be any slidable electrical contact known in the art under different terms, such as shoes, brushes, wipers, etc., that interface with and enable electrical conduction from power rails 108 into terminals 306. Specifically, carbon brush 406 contacts one of power rails 108 and initiates current transfer from power rail 108 for delivery to work machine 100. Carbon brush 406 is typically composed of graphite mixed with one or more metals, such as copper, silver, or a copper alloy. In some examples, carbon brush 406 is substantially solid and generally has a disk-shape, similar to a hockey puck. A circular lower surface of carbon brush 406 contacts rail surface 408 and is sized to conduct amperage sufficient for the implementation. In one example, carbon brush 406 should transmit up to about 1000 Amps and is accordingly sized with an effective contact area of about six square inches. Other sizes for carbon brush 406 and current values are possible and within the knowledge of those of ordinary skill in the art.

Above carbon brush 406, a magnet 410 above a sleeve 412 encircles body 404. In some examples, magnet 410 is a permanent magnet with poles arranged overall so that a magnetic force pulls magnet 410 toward power rail 108. In one implementation, magnet 410 is a samarium cobalt magnet having an array configuration with about 68 lb-ft attraction force at a ¼ inch gap. These values are representative only and can vary without departing from the principles of the present disclosure. In other examples, magnet 410 may be an electromagnet with electrical configurations provided to generate a similar magnetic force. In FIG. 4, magnet 410 is shown elevated in the Z axis above power rail 108 to reveal carbon brush 406, which is a position for magnet 410 during initial attachment and detachment with power rail 108. In some examples, a rail surface 408 is positioned as a top layer over each of the power rails 108 and may be magnetic stainless steel or a similar material. After placing carbon brush 406 on rail surface 408, magnet 410 is pulled downward toward rail surface 408, as explained below with respect to FIGS. 5 and 6. The magnetic attraction between magnet 410 and rail surface 408 provides a secure attachment between terminal 306 and power rail 108 during operation of work machine 100. As illustrated, sleeve 412 is positioned below magnet 410. Sleeve 412 may be made of plastic having a low coefficient of friction, which can enhance sliding between sleeve 412 and rail surface 408.

FIG. 5 depicts a cross-section of terminal 306 in FIG. 4. The cross-section slices terminal 306 along the X-Z plane and shows the internal structure of terminal 306 looking in the —Y direction. Several features of terminal 306 discussed above for FIG. 4 are depicted in FIG. 5 along the exterior of terminal 306, such as body 404, magnet 410, and cap 330. The internal structure of terminal 306 shown in FIG. 5 generally separates into three sections: a lower section 500, an upper section 520, and a bridging section 540.

Within lower section 500, carbon brush 406 described above provides an interface with rail surface 408 to conduct electrical energy into terminal 306. Carbon brush 406 in the example illustrated is connected by rivets or other fastening devices to plate 502. Plate 502 may be made of a conductive material such as aluminum or copper for providing a structurally resilient surface for securing carbon brush 406 in place. Plate 502 further secures a position for a piston 504, which extends vertically along a central axis 510 upwardly in the direction of the Z axis away from carbon brush 406. Piston 504 is likewise an electrically conductive material such as aluminum alloy or copper. Piston 504 in some examples is cylindrical in shape and is surrounded by reservoir 506. As shown, reservoir 506 extends from or around plate 502 upwardly about a central axis 510. Being an electrically conductive material with structural stability, such as an aluminum alloy, reservoir 506 in some examples has inner surface 508 along an inner circumference that provides an annular or bowl shape to reservoir 506 and defines a lower chamber 512 within terminal 306. A conductive fluid 514 at least partially fills lower chamber 512 between piston 504 and inner surface 508. Conductive fluid 514 may be any flowable conductive material. In one example, conductive fluid 514 is Galinstan, which is a eutectic alloy composed of gallium, indium, and tin. Galinstan melts at −19 C (−2 F) and is thus liquid at room temperature. Mercury or other liquid metals or conductive fluids having comparable electrical and rheological properties to Galinstan may be used and are considered to be within the scope of the presently disclosed subject matter. Bearings 516, made of polymer or stainless-steel as an example, are positioned around piston 504 at a bottom (in the direction of the −Z axis) of lower chamber 512 and enable piston 504 and carbon brush 406 to twist angularly about central axis 510. Further, a rotary seal 518, adjacent bearings 516 and formed from Teflon as an example, prevents leakage of conductive fluid 514 from reservoir 506.

Within upper section 520 of terminal 306, cap 330 connects to a post 522 to provide pressurized fluid into terminal 306 and to conduct electrical energy to neck 328. FIG. 5 illustrates a slightly different and interchangeable configuration for cap 330 than in FIG. 4. In particular, cap 330 in FIG. 4 is shaped as a quick-connect attachment that may be snapped in place within an upward opening of post 522, while cap 330 in FIG. 4 has a threaded attachment. When in place on post 522, cap 330 provides a fluid interface between passageway 402, which passes within an interior space of cap 330 along central axis 510, and an cavity 524. Post 522 is an electrically conductive material having solid structural properties, such as an aluminum alloy, copper, or similar metals, and is configured to form two openings about central axis 510: cavity 524 and upper chamber 526. Cavity 524 is formed within an upper region of post 522 (in the direction of the Z axis) defined by first interior wall 523 concentrically surrounding central axis 510. Post 522 is further configured to have a second interior wall 525 concentrically surrounding central axis 510 in a lower region of post 522 that defines upper chamber 526. Exterior to post 522, optional strut 528 is positioned along a ledge of post 522 and serves as a brace to convey mechanical forces between post 522 and shoulder

326. As such, shoulder 326 rests on and may press downwardly against strut 528 due to magnetic forces pulling magnet 410 toward 408, in a manner discussed further below. Conversely, strut 528 may press upwardly against shoulder 326 in response to forces from passageway 402 acting within cavity 524, in a manner discussed below.

Within bridging section 540 of representative terminal 306, a rod 542 and a bladder 546 connect lower section 500 with upper section 520. In some examples, rod 542 is a bolt or similar structure as shown in FIG. 5 that extends longitudinally along central axis 510 between piston 504 and cavity 524. As a result, in the example of FIG. 5, rod 542 passes at least in part within upper chamber 526. At one end (farther down central axis 510 in the −Z direction), rod 542 is secured to piston 504, such as through a threaded engagement, an adhesive, a weld, or other suitable means. At an opposite end (farther up central axis 510 the +Z direction), rod 542 may have a head 544. Head 544 is typically a same material as rod 542, such as metal, and has a width within the X-Y plane greater than rod 542 along central axis 510. Rod 542 is loosely arranged within post 522 such that rod 542 may freely move with piston 504 at least along central axis 510.

Bladder 546 is a sleeve formed of compressible material such as one or more layers of rubber possibly having a nylon reinforcement. As with an airbag or air spring, bladder 546 may have a substantially tubular or bulbous shape and is formed around central axis 510. In some examples, one end of bladder 546 is fixed in place at upper attachment 548 between sides of post 522 and strut 528, as shown in FIG. 5. At an opposite end, bladder 546 may be fixed in place to a radially outer side of reservoir 506 at lower attachment 550. Bladder 546 is typically configured with some slack between upper attachment 548 and lower attachment 550, as indicated by fold 552, to accommodate movement upward and downward along central axis 510 by lower section 500 of terminal 306. Bladder 546 defines middle chamber 554, which is an open cavity within its walls sufficient to contain one or more flowable substances. Upper attachment 548 and lower attachment 550 provide a sealed connection between bladder 546, post 522, and reservoir 506 sufficient to contain the one or more flowable substances within middle chamber 554 without leakage. In some examples, the one or more flowable substances within middle chamber 554 may include an insulative fluid 556, which may be any liquid or gas having electrical insulative properties, such as air. Insulative fluid 556 may be the same or a different substance as the pressurized fluid introduced into passageway 402. In other examples, including as shown in FIG. 6 and discussed below, the one or more flowable substances within middle chamber 554 may include ones that are electrically conductive, such as conductive fluid 514.

Turning to operation of terminal 306, FIGS. 4 and 5 illustrate a configuration in which terminal 306 is in the process of being attached or detached from a representative power rail 108. In this configuration, pressurized fluid is used to help keep magnet 410 separated from rail surface 408 to provide maneuverability for carbon brush 406 and terminal 306 to be positioned, typically by hand. In some examples, attachment or detachment occurs by inserting a fluid such as air within passageway 402 at a pressure above atmospheric pressure sufficient to cause post 522 to be lifted axially in the direction of the Z axis. Introduced from one of tubes 332 (FIG. 3), the pressurized fluid enters passageway 402 along central axis 510, applying an expansive force indicated as F1 at least within upper chamber 526. Pressurized fluid in the arrangement of FIG. 5 will also enter middle chamber 554, causing pliable bladder 546 to expand. As a result, expansive force F1 will tend to push post 522 upwardly, which in turn will press strut 528 upwardly against shoulder 326, and will push carbon brush 406 against rail surface 408 (downward force F2 in FIG. 5). On the other hand, magnet 410, which may surround body 404 and rest on a lower lip of body 404 above 412, has a downward gravitational pull due to its mass and, when terminal 306 is positioned on power rail 108, magnetic attraction toward rail surface 408. These combined gravitational and magnetic forces from magnet 410 are denoted as F3 in FIG. 5. In the state illustrated in FIG. 5, fluid introduced to passageway 402 is at sufficient pressure to generate upward force F1 against shoulder 326 in excess of the downward magnet force F3 pulling between magnet 410 and rail surface 408. As a result, as shown in FIGS. 4 and 5, with sufficiently high fluid pressure fed into passageway 402, magnet 410 may be lifted, or otherwise kept apart, from rail surface 408.

In the configuration depicted in FIG. 5, magnetic attraction between magnet 410 and rail surface 408 is counteracted, and an operator can readily attach or detach terminal 306 as part of current collector 118 with respect to power rail 108. Moreover, with force F2 exceeding force F3, post 522 will be lifted, or otherwise kept apart, from reservoir 506 and a conductive-fluid surface 560, ensuring electrical isolation between lower section 500 and upper section 520. In some examples, such as with magnet 410 being a samarium-cobalt magnet with about 68 lb-ft attraction force at ¼ inch gap, air or other fluid provided within passageway 402 above about 20 PSI can provide sufficient pneumatic or hydraulic force F1 to overcome the downward pull F3 on body 404, resulting in the separated configuration for terminal 306 as shown in FIGS. 4 and 5. These values are representative only and other pressure values may achieve similar results based on the components employed for an implementation. Variation and alternatives are within the knowledge of those of ordinary skill in the art.

The axial separation between post 522 and reservoir 506 will generally be proportional to the fluid pressure maintained within upper chamber 526. At one extreme, shown in FIG. 5, the fluid pressure is sufficiently high to force post 522 upwardly along central axis 510 to a point that an upper stop 558 within post 522 contacts a lower surface of head 544. This contact creates a blockage to halt further upward movement of post 522 along central axis 510 with even higher values of fluid pressure, such as above 20 PSI in some examples, fixing lower section 500 and upper section 520 of terminal 306 in a position of full extension or separation. With lower values of fluid pressure, such as below 20 PSI in some examples, the ratio between upward force F1 and downward magnet force F3 lessens, and lower section 500 and upper section 520 of terminal 306 will move closer to each other. FIG. 6 illustrates an example of terminal 306 in FIG. 5 after moving into a position of less than full extension.

In FIG. 6, fluid pressure fed into passageway 402 is less than in FIG. 5, such as less than about 20 PSI in some examples. In this arrangement, the fluid pressure within upper chamber 526 is an amount such that expansive pneumatic or hydraulic force F1 does not exceed the downward magnet force F3. As a result, as shown in FIG. 6, magnet 410 pulls body 404 downward compared with its position in FIG. 5 and forces sleeve 412 into contact with rail surface 408. Phantom lines in FIG. 6 show the difference in position for the exterior of terminal 306 in FIG. 5 compared with in FIG. 6. Terminal 306 is thereby held in engagement with rail surface 408 sufficiently to resist external forces, such as those imparted by work machine 100 moving across rough surfaces of haul route 101, that may urge separation of terminal 306 from rail surface 408. On the other hand, attraction between magnet 410 and rail surface 408 is low enough to permit sleeve 412 to slide along rail surface 408 as current collector 118 is pulled by trailing arms 116 without causing undue drag. Selection of appropriate magnetic properties for magnet 410 based on the components chosen for a particular implementation will be within the knowledge of those of ordinary skill in the art.

Referring to the interior of terminal 306 in the cross-section of FIG. 6, the decrease in pneumatic or hydraulic force F1 results in magnet force F3 pulling shoulder 326, strut 528, and post 522 downward relative to rod 542. As upper section 520 is lowered, a post bottom 602 dips into conductive fluid 514 within lower chamber 512 of reservoir 506. Contact between the solid metal of post bottom 602 and conductive fluid 514, which may be a liquid metal such as Galinstan, completes an electrical path from carbon brush 406 to neck 328. To mitigate the risk of arcing, insulative fluid 556 may be partly or wholly oil or another inert media rather than air. In some examples, the inert media has the same or greater density than the pressurized fluid entering passageway 402 and a lower density than conductive fluid 514, causing the inert media to cover conductive-fluid surface 560. As post bottom 602 enters lower chamber 512 and displaces a portion of conductive fluid 514, conductive-fluid surface 560 will rise into middle chamber 554 within bladder 546. It will be apparent that the amount of immersion for post 522 within conductive fluid 514 can be controlled based on the fluid pressure provided into passageway 402. As noted for FIG. 5, at high values of fluid pressure, such as above 20 PSI in some examples, no immersion for post 522 will occur and terminal 306 will be in a position of full extension. On the other hand, with upper chamber 524 at atmospheric pressure, post 522 may be lowered into immersion in conductive fluid 514 to an extent where post bottom 602 contacts a lower stop 604 on reservoir 506, i.e., an extreme position of full compression. At pressure values within upper section 520 in between the extremes of full extension and full compression, such as about 5 PSI for some examples, post bottom 602 may be immersed within conductive fluid 514 without contacting lower stop 604, as illustrated in FIG. 6.

Accordingly, the described arrangement enables terminal 306 to effectively function as a pneumatically or hydraulically controlled mechanical and electrical switch. Mechanically, magnet 410 and rail surface 408 can be forced apart and allowed to contact based on application of appropriate fluid pressure to terminal 306. Electrically, a position of post 522 can be moved axially to be separated from conductive fluid 514 (open circuit) or immersed in conductive fluid 514 (closed circuit) using appropriate fluid pressure. The combination of mechanically forcing magnet 410 apart from rail surface 408 and forcing post 522 apart from conductive fluid 514 in full extension increases safety to personnel during attachment and detachment of current collector 118 to power rail 108 in the event power rail 108 is electrified. Moreover, the pneumatic or hydraulic networking of an array of terminals 306 within current collector 118 permits the control to affect all terminals 306 within the current collector. As such, current collector 118 can be commanded pneumatically or hydraulically from a source such as work machine 100 to open or close an electrical circuit within current collector 118 and to engage or disengage a magnet clamping force against the 108.

In addition to adjusting immersion or separation of post 522 with respect to lower attachment 550, fluid pressure within upper chamber 526 may also be selected or modified to achieve a desired contact pressure between carbon brush 406 and rail surface 408, indicated as force F2 in FIG. 6. Contact pressure for carbon brush 406 can affect current transfer from rail surface 408 to work machine 100, for example, with too little force F2 possibly leading to periodic disconnections from rail surface 408 or arcing. Contact pressure for carbon brush 406 can also impact wear on carbon brush 406, with too much force F2 possibly leading to premature deterioration of carbon brush 406 due to friction with rail surface 408. While magnet 410 and sleeve 412 provide a stable and slidable connection with rail surface 408 even over rough surfaces of haul route 101, the interior of terminal 306 enables independent adjustment of the force F2 for carbon brush 406 to optimize current transfer and material wear. Pressure values within upper chamber 526 for optimizing these features will be within the knowledge of those skilled in the art based on specific implementations, but in one example the fluid pressure may be about 5 PSI for suitable performance.

Consistent with the principles of the present disclosure, bridging section 540 also provides functionality for terminal 306 similar to an air spring, an airbag, or a fluid suspension between upper section 520 and lower section 500 (and specifically between post 522 and carbon brush 406). Bladder 546 has a resilient and flexible structure that permits it to be moved in multiple dimensions, such as stretched or contracted along central axis 510, twisted angularly around central axis 510, or moved laterally from central axis 510. Because piston 504 and rod 542 sit loosely within upper chamber 526, and post bottom 602 sits loosely within lower chamber 512, bladder 546 further enables lower section 500 to move in multiple dimensions relative to post 522. For instance, sliding along rail surface 408, terminal 306 may encounter a dip or a bump in the surface (i.e., a vertical deviation in rail surface 408 along the Z axis). Bridging section 540 enables piston 504, and lower section 500 generally, to react to the vertical deviation by moving upwardly or downwardly along central axis 510. In this way, bridging section 540 may act as a shock absorber for carbon brush 406. In another example, if terminal 306 encounters a slant in rail surface 408 (i.e., a rotation to a portion of rail surface 408 in the X-Z plane), bladder 546 enables lower section 500 to move laterally along horizontal axis 606 as well as vertically along central axis 510 as necessary to accommodate the slant. As a result, this air-spring functionality for bridging section 540 provides terminal 306 with the ability to adapt to small imperfections in rail surface 408 while maintaining maximum and uniform surface contact between carbon brush 406 and rail surface 408.

Lower section 500 and bridging section 540 also enable terminal 306 to twist angularly about central axis 510. Specifically, bearings 516 and rotary seal 518 seal conductive fluid 514 within lower chamber 512 while also permitting piston 504 to rotate about central axis 510 independently from reservoir 506. The loose association of piston 504 and rod 542 within upper section 520 further frees piston 504 to twist about 501. Consequently, if carbon brush 406 begins to wear unevenly (e.g., decreasing in thickness at an outer side along horizontal axis 606), downward force F1 in some examples will cause a slightly higher force on one side of carbon brush 406, causing piston 504 and carbon brush 406 to rotate around central axis 510. This rotation will compensate for and eventually equalize the wear across the contacting surface of carbon brush 406. Deterioration of carbon brush 406 will therefore be kept uniform across the sliding surface and a maximum contact area with rail surface 408 can be maintained during extended use of terminal 306. Overall, the free movement of carbon brush 406 due to bridging section 540, whether vertically, laterally, or angularly, will help maintain a consistent contact area and consistent contact force for carbon brush 406, increasing contact quality and current flow while decreasing risks of arcing.

Another feature of the current collector 118 arises from the array of terminals 306 configured within frame 302. As discussed above in reference to FIG. 3, frame 302 in the illustrated example includes a plurality of terminals 306 for each power rail 108, such as first inner terminal 306A-1, second inner terminal 306A-2, and second inner terminal 306A-2 for inner rail 108A. Tubes 332 provide pressurized fluid from a common source (not shown) within work machine 100 to each of these terminals. Accordingly, as each of the terminals for a rail may start to wear differently, the fluid pressure provided can help to balance the downward forces F2 provided across the terminals so that those forces are substantially equal to ensure a constant and consistent contact pressure for each of the terminals. Similarly, as tubes 332 supply fluid pressure from a common source to terminals on other rails, such as middle rail 108B and outer rail 108C, uneven wear on terminals between rails can be naturally balanced with distributed fluid pressure.

Figure 7:
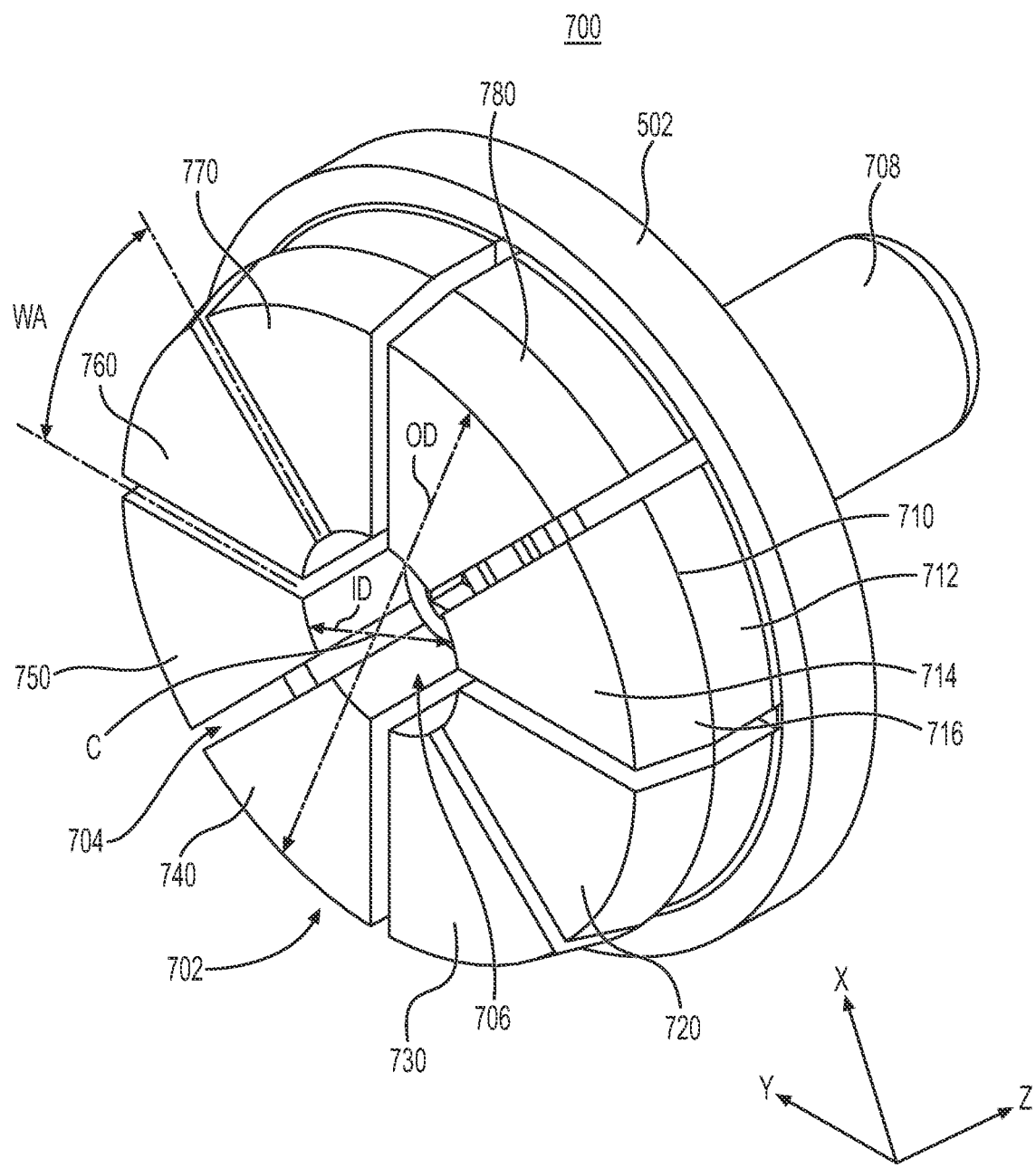
FIG. 7 is an isometric view of one carbon-brush assembly in accordance with an example of the present disclosure.

Although carbon brush 406 may be implemented as a solid structure with a disk-shape, additional versatility for terminal 306 may be achieved by dividing carbon brush 406 into sections. FIG. 7 shows an isometric view of an underside of an alternative implementation of carbon brush 406 and plate 502 with a segmented carbon brush 406. The structure in FIG. 7, generally depicted as brush assembly 700, includes a carbon brush 702 having an overall disk-shape collectively formed from a plurality of sections. In some examples such as illustrated, carbon brush 702 is made of eight sections each having a wedge or pie shape, namely, first wedge 710, second wedge 720, third wedge 730, fourth wedge 740, fifth wedge 750, sixth wedge 760, seventh wedge 770, and eighth wedge 780. First wedge 710 is representative and generally includes a first side 712 forming a portion of a circumferential outer surface of carbon brush 702 and a first bottom surface 714 aligned in the X-Y plane and intended to contact rail surface 408 in operation. A first chamfer 716 bridges first side 712 to first bottom surface 714.

Together, the wedges in carbon brush 702 roughly form a disk as with carbon brush 406 and have a substantially circular bottom surface within the X-Y plane (such as with first bottom surface 714 of first wedge 710) for contacting rail surface 408 when in operation. A distance across the substantially circular bottom surface and through a center point C is depicted in FIG. 7 as outer diameter OD and, in one example, may be about 3 inches. Carbon brush 702 further includes a central space 706 having a distance across the center point C as an inner diameter ID of, in one example, about one inch. Shown in FIG. 7 for sixth wedge 760, wedges are separated by a lateral gap 704, which in some instances may be about 1/10 of an inch. All of these dimensions are representative only and may differ as needed. Moreover, as shown for first wedge 710, each section has a wedge angle WA measured from the center point C within the substantially circular bottom surface. In one example, for a carbon brush 702 having eight sections as shown, wedge angle WA is about 45 degrees. Each of the sections of carbon brush 702 is secured to plate 502 by any suitable means, such as adhesion, riveting, bolting, or the like. In one option, a bolt (not shown) through central space 706 along the Z axis clamps the sections against plate 502. Finally, a shaft 708 extends from plate 502 and may be used to attach brush assembly 700 to piston 504 along central axis 510. The configuration of FIG. 7 is illustrative only, and the number, shape, and dimensions for the sections (e.g., the number, shape, and/or dimensions of the wedges included in the brush assembly 700) and support structure of brush assembly 700 may vary for a desired implementation.

The structure and composition of the sections in carbon brush 702 provide added versatility for current collector 118. For instance, lateral gap 704 between each of the sections, as well as central space 706, enables air to vent through those areas to help cool carbon brush 702. In addition, while the material for carbon brush 702 is typically a composite material of graphite blended with various metals, such as copper, silver, or a copper alloy, the use of multiple sections enables a mixing and matching of different compositions to achieve a desired overall performance. In one example, one or more sections of carbon brush 702, e.g., first wedge 710, third wedge 730, fifth wedge 750, and seventh wedge 770, have a first composition selected to provide elevated electrical properties, such as low electrical resistance. For that same exemplary carbon brush 702, one or more other sections, e.g., second wedge 720, fourth wedge 740, sixth wedge 760, and eighth wedge 780, may have a second composition selected to provide elevated mechanical properties, such as an abrasive property for cleaning rail surface 408 while sliding. Particular compositions for each of the sections may also be chosen based on the environment in which brush assembly 700 is intended to be used, which may impact the wear and duration of carbon brush 702. The implementation for carbon brush 702 is not limited to these described examples, and other compositions and mixtures between sections are within the knowledge and routine experimentation of those of ordinary skill in the art.

Figure 8:
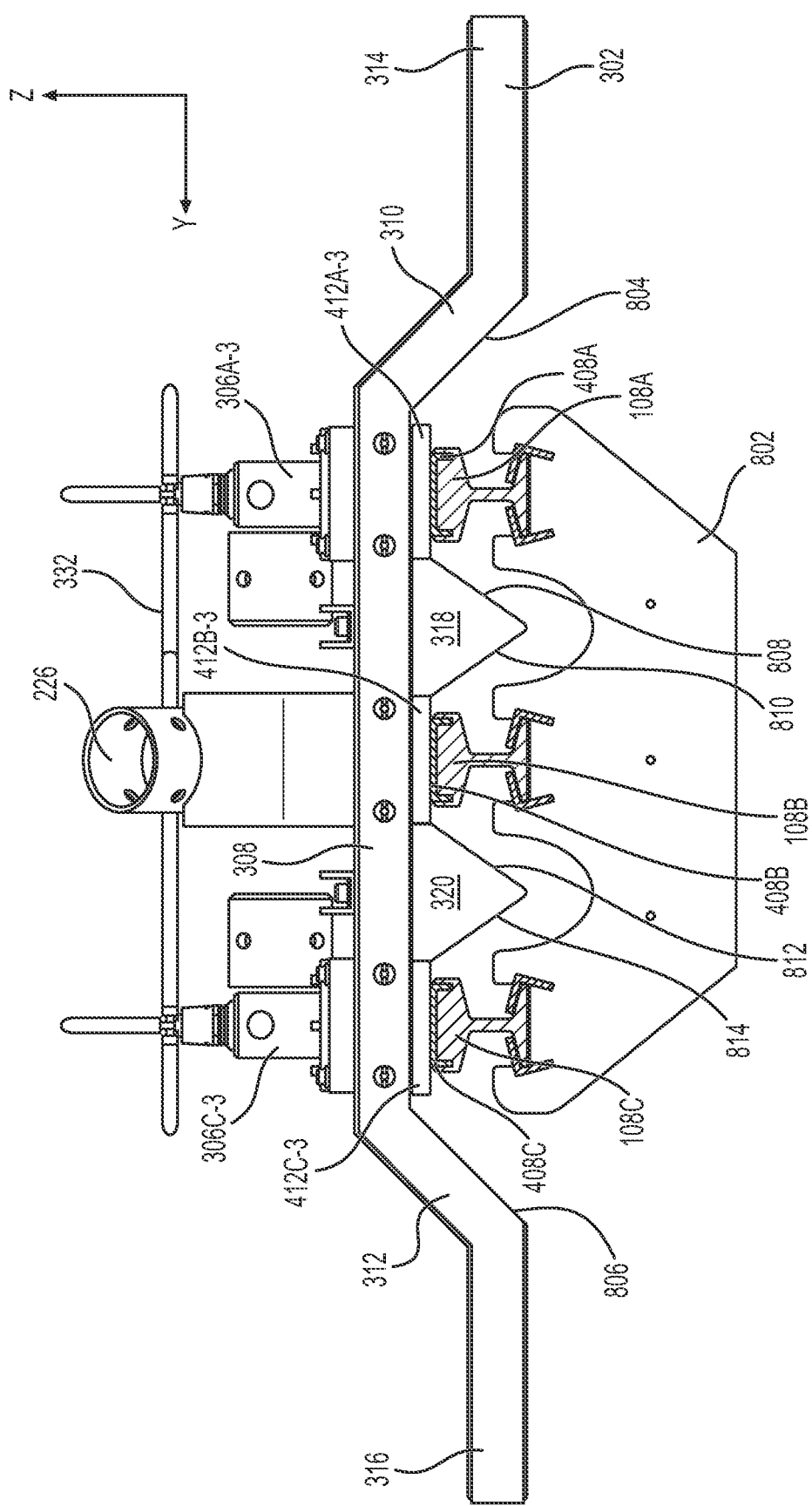
FIG. 8 is a rear view of the current collector in FIG. 3 engaged on elevated power rails in accordance with an example of the present disclosure.

While FIGS. 4-7 are directed to features of terminal 306 and its associated structure, FIG. 8 illustrates the terminals installed within frame 302 and mounted on power rail 108. FIG. 8 is essentially a rear view of current collector 118 in FIG. 2 looking along the direction of forward travel for work machine 100, i.e., along the X axis. As indicated in FIG. 8, inner rail 108A, middle rail 108B, and outer rail 108C are held in place by a plate 802 or bracket that may be elevated above ground by a pole (not shown). Frame 302 forms the support structure for current collector 118, and sleeve 412 on each terminal 306 glides across a rail surface 408 for separate ones of power rail 108. As an example, third inner terminal 306A-3 is installed within substrate 308 of frame 302 and has third inner sleeve 412A-3 contacting inner rail surface 408A of inner rail 108A. Although blocked in FIG. 8 by third inner sleeve 412A-3, carbon brush 406A-3 is forced against inner rail surface 408A by fluid pressure injected from tubes 332. Similar connections exist for 416B-3 (within third middle sleeve 412B-3) against middle rail surface 408B and for 416C-3 (within third outer sleeve 412C-3) against outer rail surface 408C.

FIG. 8 illustrates how angled inner side 310 and angled outer side 312, together with inner bumper 318 and outer bumper 320, provide protection and lateral stability for current collector 118 as it slides along power rail 108. As an example, angled inner side 310 has a first face 804 and angled outer side 312 has a second face 806 each angled to face power rail 108 on the underside of frame 302. As well, inner bumper 318 has a first wall 808 angled to face inner rail 108A and a second wall 810 angled to face middle rail 108B, while outer bumper 320 has a first wall 812 angled to face middle rail 108B and a second wall 814 angled to face outer rail 108C. With current collector 118 positioned in contact with power rail 108, these angled faces and walls help shield the carbon brushes under the multiple terminals 306 from debris. Moreover, the angled faces and walls can help ensure the lateral positioning for current collector 118. If trailing arms 116 were to pull current collector 118 horizontally, such as in the direction of the Y axis in FIG. 8, first face 804 would collide with inner rail 108A and provide a physical block to resist further movement in that direction. Likewise, second wall 810 on inner bumper 318 would contact middle rail 108B, and second wall 814 on outer bumper 320 would contact outer rail 108C, also resisting movement of current collector 118 along the Y axis. Similarly, if trailing arms 116 were to pull current collector 118 in the direction of the —Y axis, second face 806 on angled outer side 312 in some examples would collide with outer rail 108C, first wall 812 of outer bumper 320 would collide with middle rail 108B, and first wall 808 on inner bumper 318 would collide with inner rail 108A, each providing a physical block to resist further movement in the —Y direction. These angled faces and walls permit minor lateral forces to cause current collector 118 to shift or shimmy horizontally on power rail 108 as it slides, but prevent those minor forces from detaching current collector 118.

Figure 9:
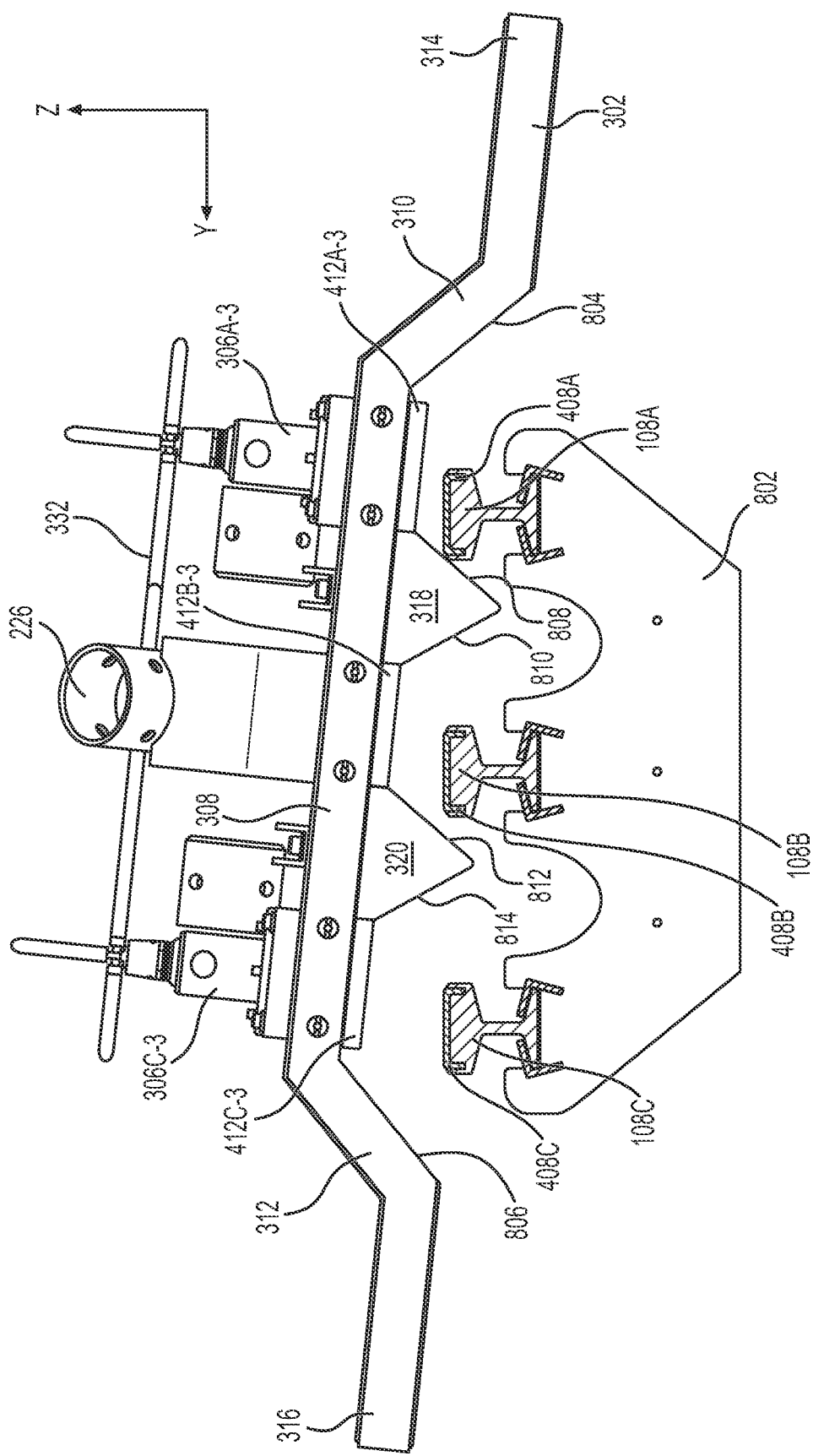
FIG. 9 is a rear view of the current collector in FIG. 3 detached from elevated power rails in accordance with an example of the present disclosure.

Excessive forces from trailing arms 116 that exceed a threshold may cause current collector 118 to become detached and lifted from power rail 108. In some implementations, trailing arms 116 may be configured such that excessive forces cause current collector 118 to be lifted from power rails 108 only in a vertical direction along the Z axis, such that the carbon brushes remain substantially parallel with the rail surfaces. In other implementations for trailing arms 116, current collector 118 could be lifted from power rails 108 angularly, such that the carbon brushes are no longer parallel with the rail surfaces. FIG. 9 illustrates an example from this latter implementation, showing how, even with angular detachment of current collector 118, the angled faces and walls at the underside of frame 302 help avoid incorrect re-engagement between terminals and rails.

In FIG. 9, current collector 118 is depicted in a condition where an external force from trailing arms 116, such as through middle contactor lug 226, has sufficient strength to overcome the adhesion of the multiple magnets to the rails, and current collector 118 is detached and lifted from the rails. In this condition, but for angled inner side 310, angled outer side 312, inner bumper 318, and outer bumper 320, current collector 118 may be displaced laterally to the point that when current collector 118 drops back to the rails, the carbon brushes become engaged to the wrong rails. For example, if current collector 118 were shifted significantly to the right in FIG. 9, but for inner bumper 318, outer bumper 320, and angled outer side 312, third middle sleeve 412B-3 could land on inner rail surface 408A and third outer sleeve 412C-3 could land on middle rail surface 408B. This misalignment could lead to problems for work machine 100 if the rails are electrified with different poles. In this circumstance, however, at least first wall 808 in FIG. 9 prevents the rightward shift of current collector 118 by colliding with inner rail 108A. It will be appreciated that if current collector 118 is lifted farther upwards and rightwards from power rail 108 in FIG. 9, inner bumper 318 and outer bumper 320 will continue to block a misaligned engagement between terminals and rails. In addition, if current collector 118 were lifted above inner bumper 318 and outer bumper 320 and shifted to the right such that third middle sleeve 412B-3 were above inner rail 108A, outer flange 316 will collide with outer rail 108C and minimize the risk of engagement of terminals with incorrect rails. Further, should the external forces be such as to continue pulling current collector 118 laterally from power rail 108, outer bumper 320 will allow frame 302 to slide away from the rails without snagging or otherwise causing a disruptive separation. Similar behavior will follow if the external forces were to pull current collector 118 leftward in FIG. 9 with the angled surfaces of first face 804, second wall 810, and second wall 814, as well as inner flange 314 of frame 302 providing structural protection against improper re-engagement. It will be appreciated that the particular shapes and angles of first face 804, second face 806, first wall 808, second wall 810, first wall 812, and second wall 814 can be selected or tuned to achieve desired lateral stability and controlled separation of current collector 118 from power rail 108.

Figure 10:
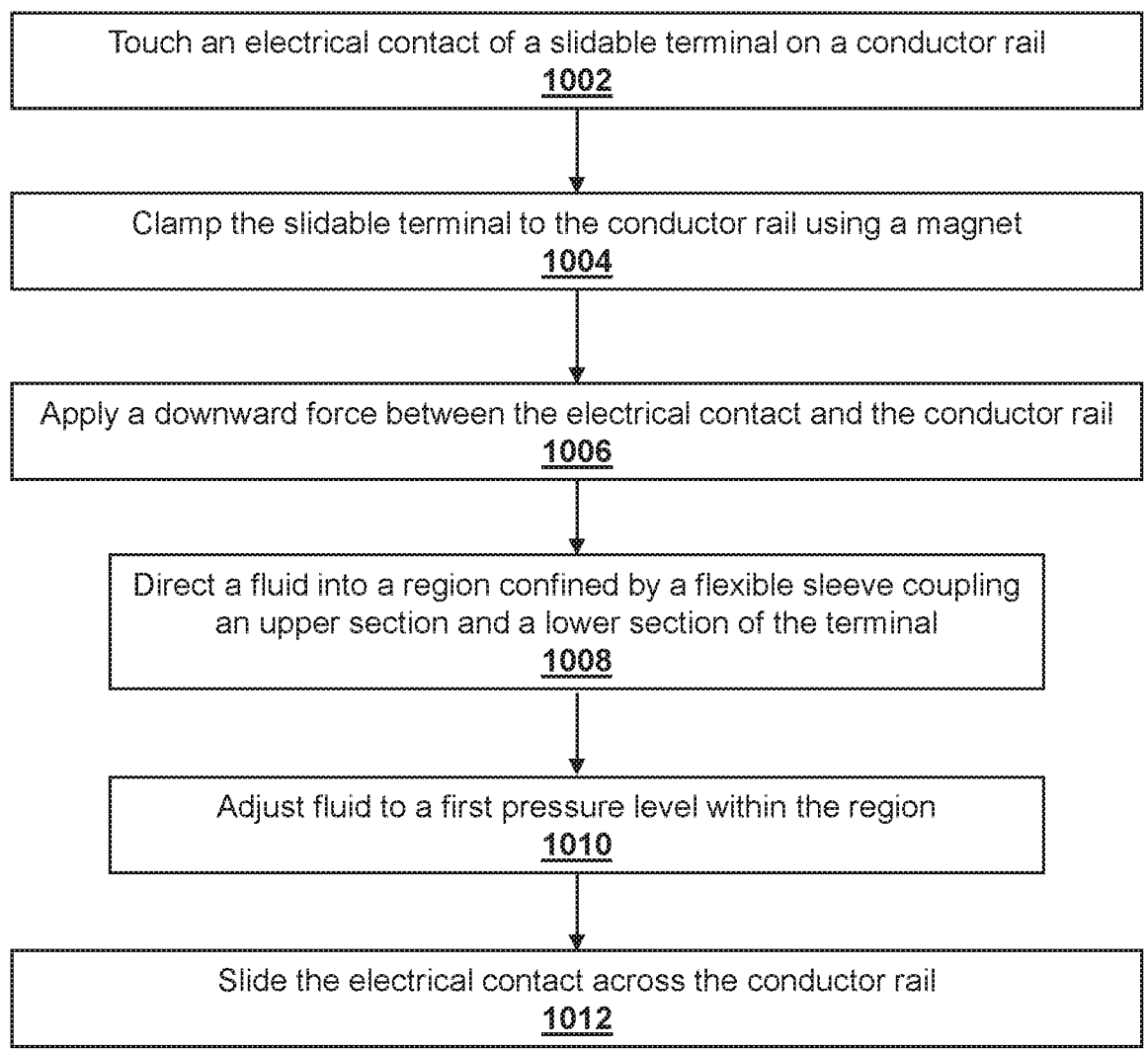
FIG. 10 is a flowchart of a method of engaging a slidable electrical contact with a conductor rail in accordance with an example of the present disclosure.

A method for engaging a slidable electrical contact with a conductor rail is defined by representative steps consistent with the present disclosure in the flowchart of FIG. 10. For the method of FIG. 10, the steps in which the method is described are not intended to be construed as a limitation. Any number of steps can be combined in any order to implement the disclosed method, can be performed in parallel to implement the processes, and in some embodiments, one or more blocks of the process can be omitted entirely. Moreover, the processes can be combined in whole or in part with other methods.

In FIG. 10, the method 1000 begins with a step 1002 of touching an electrical contact of a slidable terminal on a conductor rail. As indicated above, a carbon brush 406 of a terminal 306 within a current collector 118 may be set on a 408, as shown in FIGS. 4 and 5, for example. In step 1004, the slidable terminal is clamped to the conductor rail using, at least in part, an attractive force between a magnet surrounding a body of the slidable terminal and conductor rail. A comparison of FIGS. 5 and 6 illustrates one arrangement where magnet 410 surrounding body 404 pulls body 404 downward with force F3 and clamps terminal 306 to rail surface 408.

Method 1000 continues with step 1006 of applying a downward force along a central axis between the electrical contact and the conductor rail. The method 1000 further includes step 1008 of directing a fluid through an upper section of the terminal and into a region confined by a flexible sleeve, the flexible sleeve coupling the upper section and a lower section of the terminal and being positioned radially around the central axis. FIG. 6 illustrates a representative terminal 306 in which pressurized fluid, typically a gas such as air, is fed through passageway 402 and into cavity 524 and upper chamber 526. At least upper chamber 526 and middle chamber 554 (FIG. 5) are confined by bladder 546, which extends around central axis 510 and bridges post 522 of upper section 520 with reservoir 506 of lower section 500. In a next step 1010 of method 1000, pressure for the fluid is adjusted to a first pressure level within the region, which as discussed above leads to force F2 pressing downwardly along central axis 510 on carbon brush 406 and into rail surface 408. Finally, step 1012 entails sliding the electrical contact across the conductor rail, which may be seen in at least FIG. 1 as work machine 100 traverses haul route 101 and pulls current collector 118 using trailing arms 116.

Those of ordinary skill in the field will appreciate that the principles of this disclosure are not limited to the specific examples discussed or illustrated in the figures. For example, while current collector 118 is described having an array of nine terminals in a square grid, any number and arrangement of terminals will suffice. Moreover, while the disclosure describes terminal 306 as having an interplay of pneumatic/hydraulic and magnetic forces, terminal 306 could be implemented without magnet 410 if desired. In addition, the principles disclosed are not limited to implementation on a work machine. Any moving vehicle deriving electrical power from a ground-based conductor rail could benefit from the examples and techniques disclosed and claimed.

INDUSTRIAL APPLICABILITY

The present disclosure provides systems and methods for sliding a current collector across conductor rails to deliver electrical power to a moving work machine, such as a hauler at a mining site. The current collector has an array of terminals with carbon brushes. The terminals have upper sections with conductive posts, lower sections that include reservoirs of liquid metal, and bladders that connect the upper sections with the lower sections. Magnets surround outer shells of the terminals. Fluid above a threshold pressure fed into the bladders holds the upper sections apart from the lower sections to open an electrical path and forces the magnets away from the conductor rails, enabling easy and safe engagement and disengagement with the rails. Fluid below the threshold pressure allows the magnets to clamp the terminals to the conductor rails, lowers the conductive posts into the liquid metal, and urges the carbon brushes against the conductor rails. The bladders provide a fluid suspension distributed across the array of terminals, providing consistent electrical contact between the carbon brushes and the rails and balancing wear of the carbon brushes.

As noted above with respect to FIGS. 1-10, a terminal 306 for an electric current collector has a lower section 500 including a carbon brush 406, a reservoir 506, and a conductive fluid 514 within the reservoir 506. The reservoir 506 and the conductive fluid 514 are disposed about a central axis 510, and the carbon brush 406 and the conductive fluid 514 are electrically connected. An upper section 520 includes a post 522 that is hollow and defines at least an upper chamber 526 along the central axis 510. A bridging section 540 includes a bladder 546 and an insulative fluid 556 within the bladder 546. The bladder 546 is pliable, connects the lower section 500 with the upper section 520, and extends radially around the central axis 510. The pliable bladder 546 permits movement of the carbon brush 406 with multiple degrees of freedom, which helps ensure stable contact between the carbon brush 406 and a conductive rail and helps achieve even wear for the surface of the carbon brush 406.

In the examples of the present disclosure, bladder 546 within an array of terminals provide a distributed fluid suspension for a current collector 118. Acting as a shock absorber or air spring, bladder 546 within a bridging section 540 of a terminal 306 allows for axial, radial, and angular compensation at the interface between carbon brush 406 within a lower section 500 of the terminal 306 and a rail surface 408. As a result, this fluid suspension can help establish and maintain consistent contact between carbon brush 406 and a rail surface 408, providing high-quality current transfer for the work machine 100 and enabling balanced wear for the carbon brush 406. Moreover, with axial extension and compression of terminal 306 controlled by fluid pressure, a current collector 118 can be commanded pneumatically or hydraulically from a source such as work machine 100 to open or close an electrical circuit within current collector 118 and to engage or disengage a magnet clamping force against the 108, providing versatile and safe operation of the system.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Terms of approximation are meant to include ranges of values that do not change the function or result of the disclosed structure or process. For instance, the term "about" generally refers to a range of numeric values that one of skill in the art would consider equivalent to the recited numeric value or having the same function or result. Similarly, the antecedent "substantially" means largely, but not wholly, the same form, manner or degree, and the particular element will have a range of configurations as a person of ordinary skill in the art would consider as having the same function or result. As an example, "substantially parallel" need not be exactly 180 degrees but may also encompass slight variations of a few degrees based on the context. While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An electric current collector for sliding in a direction along one or more power rails, comprising:
    a substrate having a central longitudinal axis, the substrate including an upper surface, a lower surface, an inner lateral edge, and an outer lateral edge, the inner lateral edge and the outer lateral edge being on opposite sides of the central longitudinal axis;
    an inner wall extending below the substrate from the inner lateral edge at an inner obtuse angle relative to the lower surface;
    an outer wall extending below the substrate from the outer lateral edge at an outer obtuse angle relative to the lower surface;
    a first bumper disposed along the lower surface of the substrate, the first bumper extending substantially parallel to the longitudinal axis; and
    a first electrical terminal having a first contact projecting from the lower surface between the inner wall and the first bumper.

2. The electric current collector of claim 1, wherein the first bumper has a first inner face and a first outer face, the first inner face extending from the lower surface adjacent the first electrical terminal and at an angle relative to the lower surface away from the inner wall.

3. The electric current collector of claim 1, further comprising a second electrical terminal having a second contact projecting from the lower surface between the outer wall and the first bumper.

4. The electric current collector of claim 3, further comprising a second bumper extending from and along the lower surface of the substrate substantially parallel to the longitudinal axis, wherein the second bumper is positioned between the outer wall and the second contact.

5. The electric current collector of claim 4, further comprising a third electrical terminal having a third contact projecting from the lower surface between the outer wall and the second bumper.

6. The electric current collector of claim 5, wherein the second bumper has a second inner face and a second outer face, the second outer face extending from the lower surface adjacent the third electrical terminal and at an angle relative to the lower surface away from the outer wall.

7. The electric current collector of claim 6, wherein the first contact, the second contact, and the third contact are configured to slide along different ones of the one or more power rails.

8. The electric current collector of claim 1, further comprising an inner flange extending from the inner wall laterally away from the longitudinal axis and an outer flange extending from the outer wall laterally away from the longitudinal axis.

9. The electric current collector of claim 1, wherein the upper surface and the lower surface are fiberglass and the substrate further comprises a foamed polymer between the upper surface and the lower surface.

10. The electric current collector of claim 1, wherein the first electrical terminal passes through the substrate from the upper surface to the lower surface.

11. A work machine, comprising:
an electric engine;
traction devices configured to cause movement of the work machine disposed proximate a haul route when powered by the electric engine; and
a current collector configured to move across a surface of at least one power rail along the haul route and conduct electrical energy to the electric engine, the current collector comprising:
a frame having a central substrate along a longitudinal axis and sloped shoulders on opposing lateral sides of the central substrate, the central substrate having a first surface and a second surface opposite the first surface with orifices extending from the first surface to the second surface, wherein the orifices are arranged in at least two rows substantially parallel to the longitudinal axis;
electrical terminals positioned within the orifices; and
at least one triangular wedge extending along an underside of the central substrate between the at least two rows.

12. The work machine of claim 11, wherein the electrical terminals include contacts exposed below the central substrate, and wherein at least one of the contacts in a first of the at least two rows is laterally adjacent to one of the sloping shoulders and to the at least one triangular wedge.

13. The work machine of claim 12, wherein the at least one triangular wedge has a first face laterally adjacent to the at least one of the contacts, and the first face and the one of the sloping shoulders are angled away from each other relative to the underside of the central substrate.

14. The work machine of claim 13, wherein the at least one triangular wedge has a second face laterally adjacent another of the contacts within a second of the at least two rows, and the second face and the other of the sloping shoulders are angled away from each other relative to the underside of the central substrate.

15. The work machine of claim 11, further comprising another triangular wedge extending along the underside of the central substrate between one of the at least two rows and a third row of the orifices.

16. The work machine of claim 14, further comprising flanges extending from the sloping shoulders laterally away from the longitudinal axis, the flanges being below the surface of the at least one power rail when the current collector moves across the surface.

17. A method for powering a work machine from at least one power rail, comprising:
establishing a slidable connection between a current collector associated with the work machine and a rail surface of the at least one power rail, the current collector comprising:
a central substrate along a longitudinal axis,
a sloped shoulder on a lateral side of the central substrate,
at least two rows of electrical contacts on an underside of the central substrate, and
at least one bumper between the at least two rows of electrical contacts;
sliding the current collector across the rail surface in a direction of the longitudinal axis;
during the sliding, permitting first lateral shifting of the current collector on the rail surface across a distance between the bumper and the sloped shoulder;
during the sliding, upon disengagement of the current collector from the rail surface, resisting second lateral shifting of the current collector beyond the distance between the bumper and the sloped shoulder, wherein the second lateral shifting is larger than the first lateral shifting.

18. The method of claim 17, wherein the bumper has a triangular configuration with a first side facing the sloped shoulder and a second side facing away from the sloped shoulder, the first side and the sloped shoulder being angled away from each other.

19. The method of claim 17, further comprising conducting electrical energy through the at least two rows of electrical contacts and to the work machine.

20. The method of claim 19, wherein the current collector has three rows of electrical contacts and two bumpers between the three rows of electrical contacts.

* * * * *